(12) United States Patent
Boisjolie et al.

(10) Patent No.: US 7,778,999 B1
(45) Date of Patent: Aug. 17, 2010

(54) SYSTEMS AND METHODS FOR MULTI-LAYERED PACKET FILTERING AND REMOTE MANAGEMENT OF NETWORK DEVICES

(75) Inventors: Darren Ronald Boisjolie, Valparaiso, FL (US); David Kent Haadsma, Tupelo, MS (US); Gandhi Balasubramaniam, Shalimar, FL (US); Van A. Berkemeyer, Jr., Cooper, TX (US); Amy L. Cotter, Dallas, TX (US); Robert B. Cotter, Dallas, TX (US); Gary S. Covington, Dallas, TX (US); Raymond Majoran, Ilderton (CA)

(73) Assignee: Bsecure Technologies, Inc., Fort Walton Beach, FL (US)

( * ) Notice: Subject to any disclaimer, the term of this patent is extended or adjusted under 35 U.S.C. 154(b) by 390 days.

(21) Appl. No.: 10/766,563

(22) Filed: Jan. 26, 2004

Related U.S. Application Data

(60) Provisional application No. 60/442,848, filed on Jan. 24, 2003.

(51) Int. Cl.
G06F 17/30 (2006.01)
(52) U.S. Cl. .................. 707/722; 707/723; 707/726; 707/748
(58) Field of Classification Search ............... 705/14; 707/7, 10, 722, 723, 726, 748, 999.003, 999.005, 707/999.1
See application file for complete search history.

(56) References Cited

U.S. PATENT DOCUMENTS 4,794,594 A 12/1988 Picard

| | | |
|---|---|---|
| 5,280,480 A | 1/1994 | Pitt et al. |
| 5,309,437 A | 5/1994 | Perlman et al. |
| 5,623,600 A | 4/1997 | Ji et al. |
| 5,724,027 A | 3/1998 | Shipman et al. |
| 5,734,824 A | 3/1998 | Choi |

(Continued)

FOREIGN PATENT DOCUMENTS

EP  1143660  10/2001

(Continued)

OTHER PUBLICATIONS

Cisco Systems Inc, "Transparent Bridging", Internetworking Technologies Handbook, Feb. 2002, (7 pgs).

(Continued)

*Primary Examiner*—Don Wong
*Assistant Examiner*—Thanh-Ha Dang
(74) *Attorney, Agent, or Firm*—Winstead PC

(57) ABSTRACT

A method for allowing individuals and groups of individuals to establish accountability relationships which are useful for generating shared commitments to avoid undesirable digital materials is disclosed. A application is loaded on a client which accesses a blacklist database of inappropriate words. The blacklist database associates a rating for each inappropriate word in the database. As a monitored user accesses digital content, a capture module captures the digital content in real time. All textual components of the digital content is examined and an overall appropriateness rating for each individual piece of digital content is developed. Via an access server, the data is recorded and reported and a monitoring user may a report on the data accessed by the monitored user.

23 Claims, 30 Drawing Sheets

U.S. PATENT DOCUMENTS

| | | | |
|---|---|---|---|
| 5,781,550 A | 7/1998 | Templin et al. | |
| 5,818,838 A | 10/1998 | Backes et al. | |
| 5,818,842 A | 10/1998 | Burwell et al. | |
| 5,825,772 A | 10/1998 | Dobbins et al. | |
| 5,911,043 A * | 6/1999 | Duffy et al. | 709/203 |
| 5,920,699 A | 7/1999 | Bare | |
| 5,987,457 A * | 11/1999 | Ballard | 707/5 |
| 6,012,088 A | 1/2000 | Li et al. | |
| 6,052,709 A * | 4/2000 | Paul | 709/202 |
| 6,182,141 B1 | 1/2001 | Blum et al. | |
| 6,189,008 B1 * | 2/2001 | Easty et al. | 707/10 |
| 6,236,990 B1 * | 5/2001 | Geller et al. | 707/5 |
| 6,266,664 B1 * | 7/2001 | Russell-Falla et al. | 707/5 |
| 6,279,158 B1 | 8/2001 | Geile et al. | |
| 6,321,267 B1 * | 11/2001 | Donaldson | 709/229 |
| 6,385,653 B1 | 5/2002 | Sitaraman et al. | |
| 6,421,675 B1 * | 7/2002 | Ryan et al. | 1/1 |
| 6,490,290 B1 | 12/2002 | Zhang et al. | |
| 6,519,571 B1 * | 2/2003 | Guheen et al. | 705/14 |
| 6,532,233 B1 | 3/2003 | Matsunaga et al. | |
| 6,603,769 B1 | 8/2003 | Thubert et al. | |
| 6,618,353 B2 | 9/2003 | Merrill et al. | |
| 6,651,101 B1 | 11/2003 | Gai et al. | |
| 6,654,787 B1 * | 11/2003 | Aronson et al. | 709/206 |
| 6,675,162 B1 * | 1/2004 | Russell-Falla et al. | 707/5 |
| 6,684,240 B1 * | 1/2004 | Goddard | 709/217 |
| 6,701,309 B1 * | 3/2004 | Beeferman et al. | 1/1 |
| 6,704,786 B1 | 3/2004 | Gupta et al. | |
| 6,711,171 B1 | 3/2004 | Dobbins et al. | |
| 6,748,416 B2 | 6/2004 | Carpenter et al. | |
| 6,760,915 B2 * | 7/2004 | deCarmo | 725/28 |
| 6,765,896 B1 | 7/2004 | Ahmed et al. | |
| 6,772,214 B1 * | 8/2004 | McClain et al. | 709/229 |
| 6,839,680 B1 * | 1/2005 | Liu et al. | 705/10 |
| 6,859,834 B1 * | 2/2005 | Arora et al. | 709/227 |
| 6,879,995 B1 * | 4/2005 | Chinta et al. | 709/204 |
| 6,947,985 B2 * | 9/2005 | Hegli et al. | 709/224 |
| 6,957,429 B1 * | 10/2005 | Sekijima et al. | 718/100 |
| 6,978,461 B2 * | 12/2005 | Shapiro et al. | 719/311 |
| 7,088,714 B2 | 8/2006 | Athreya et al. | |
| 7,089,246 B1 * | 8/2006 | O'Laughlen | 707/10 |
| 7,206,814 B2 * | 4/2007 | Kirsch | 709/206 |
| 7,222,157 B1 * | 5/2007 | Sutton et al. | 709/206 |
| 7,231,381 B2 * | 6/2007 | Li et al. | 707/3 |
| 7,231,392 B2 * | 6/2007 | Ro | 707/10 |
| 7,272,842 B2 * | 9/2007 | Kay et al. | 725/1 |
| 7,343,390 B2 * | 3/2008 | Cohen et al. | 709/203 |
| 7,359,935 B1 * | 4/2008 | Karipides et al. | 709/203 |
| 7,383,282 B2 * | 6/2008 | Whitehead et al. | 1/1 |
| 7,444,403 B1 * | 10/2008 | Packer et al. | 709/224 |
| 7,472,163 B1 * | 12/2008 | Ben-Yoseph et al. | 709/206 |
| 2001/0047290 A1 * | 11/2001 | Petras et al. | 705/10 |
| 2002/0015403 A1 * | 2/2002 | McConnell et al. | 370/352 |
| 2002/0042845 A1 | 4/2002 | Burmann et al. | |
| 2002/0059221 A1 * | 5/2002 | Whitehead et al. | 707/5 |
| 2002/0059429 A1 | 5/2002 | Carpenter et al. | |
| 2002/0103914 A1 * | 8/2002 | Dutta et al. | 709/229 |
| 2002/0120629 A1 * | 8/2002 | Leonard | 707/100 |
| 2002/0144275 A1 * | 10/2002 | Kay et al. | 725/87 |
| 2002/0150080 A1 | 10/2002 | Bhattacharya et al. | |
| 2002/0178381 A1 * | 11/2002 | Lee et al. | 713/201 |
| 2002/0186692 A1 | 12/2002 | Chang et al. | |
| 2002/0199194 A1 * | 12/2002 | Ali | 725/46 |
| 2003/0009495 A1 * | 1/2003 | Adjaoute | 707/501.1 |
| 2003/0041118 A1 | 2/2003 | Elnozahy et al. | |
| 2003/0051170 A1 | 3/2003 | Spearman | |
| 2003/0074466 A1 | 4/2003 | Hughes et al. | |
| 2003/0084184 A1 * | 5/2003 | Eggleston et al. | 709/234 |
| 2003/0088554 A1 * | 5/2003 | Ryan et al. | 707/3 |
| 2003/0096605 A1 * | 5/2003 | Schlieben et al. | 455/419 |
| 2003/0110272 A1 * | 6/2003 | du Castel et al. | 709/229 |
| 2003/0112767 A1 | 6/2003 | Meier | |
| 2003/0123465 A1 * | 7/2003 | Donahue | 370/401 |
| 2003/0149755 A1 * | 8/2003 | Sadot | 709/223 |
| 2003/0212675 A1 * | 11/2003 | Denesuk et al. | 707/5 |
| 2003/0229809 A1 | 12/2003 | Wexler et al. | |
| 2004/0024688 A1 * | 2/2004 | Bi et al. | 705/37 |
| 2004/0032393 A1 * | 2/2004 | Brandenberg et al. | 345/156 |
| 2004/0054661 A1 * | 3/2004 | Cheung et al. | 707/3 |
| 2004/0083448 A1 | 4/2004 | Schulz et al. | |
| 2004/0103434 A1 * | 5/2004 | Ellis | 725/58 |
| 2004/0139338 A1 * | 7/2004 | Ohmori et al. | 713/193 |
| 2004/0160903 A1 | 8/2004 | Gai | |
| 2004/0172529 A1 | 9/2004 | Culbert | |
| 2004/0177247 A1 | 9/2004 | Peles | |
| 2004/0187089 A1 | 9/2004 | Schulz | |
| 2004/0243680 A1 | 12/2004 | Mayer | |
| 2004/0258071 A1 | 12/2004 | Thomas et al. | |
| 2005/0010659 A1 | 1/2005 | Gonguet et al. | |
| 2005/0010668 A1 | 1/2005 | Chen | |
| 2005/0010877 A1 | 1/2005 | Udler | |
| 2005/0053001 A1 | 3/2005 | Jones et al. | |
| 2005/0102274 A1 * | 5/2005 | Chen | 707/3 |
| 2005/0108227 A1 * | 5/2005 | Russell-Falla et al. | 707/5 |
| 2006/0184998 A1 | 8/2006 | Smith et al. | |
| 2006/0236095 A1 | 10/2006 | Smtih et al. | |
| 2007/0192593 A1 | 8/2007 | Boisjolie et al. | |
| 2007/0199066 A1 | 8/2007 | Smith et al. | |

FOREIGN PATENT DOCUMENTS

| | | |
|---|---|---|
| EP | 1143661 | 10/2001 |
| EP | 1143662 | 10/2001 |
| EP | 1143663 | 10/2001 |
| EP | 1143664 | 10/2001 |
| EP | 1143665 | 10/2001 |
| EP | 1143681 | 10/2001 |
| JP | 2003/069631 | 3/2003 |
| WO | WO-97/18637 | 5/1997 |
| WO | WO-00/35130 | 6/2000 |
| WO | WO-00/78004 | 12/2000 |
| WO | WO-02/15491 | 2/2002 |
| WO | WO-2004/028082 | 4/2002 |
| WO | WO-2004/075509 | 9/2004 |
| WO | WO-2004/098109 | 11/2004 |

OTHER PUBLICATIONS

Cisco Systems Inc, "Mixed-Media Bridging", Internetworking Technologies Handbook, Jun. 1999, (6 pgs).

Cisco, "Mixed-Media Bridging", Cisco Systems, Internetworking Technologies Handbook, Jun. 1999 (6pages).

* cited by examiner

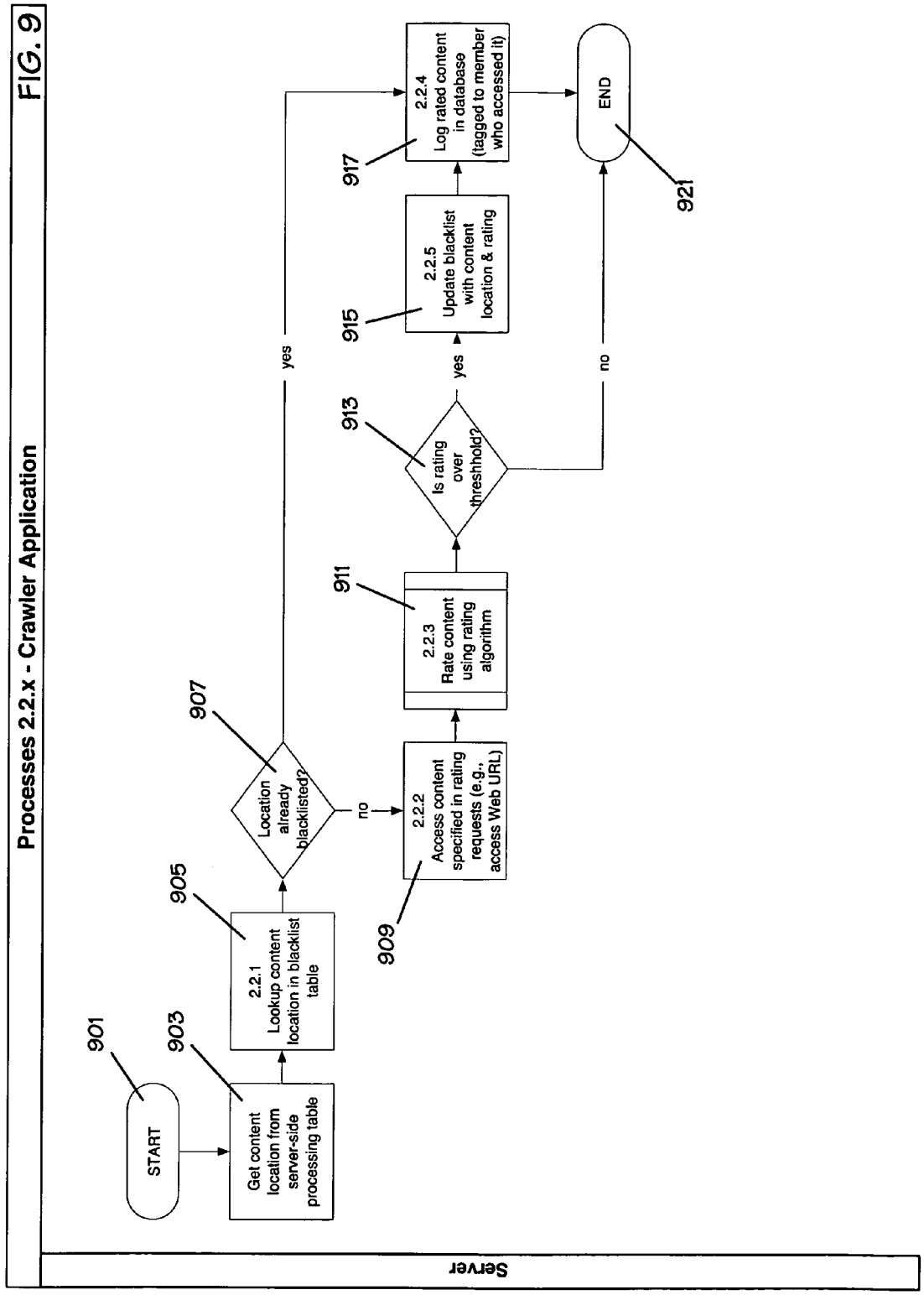

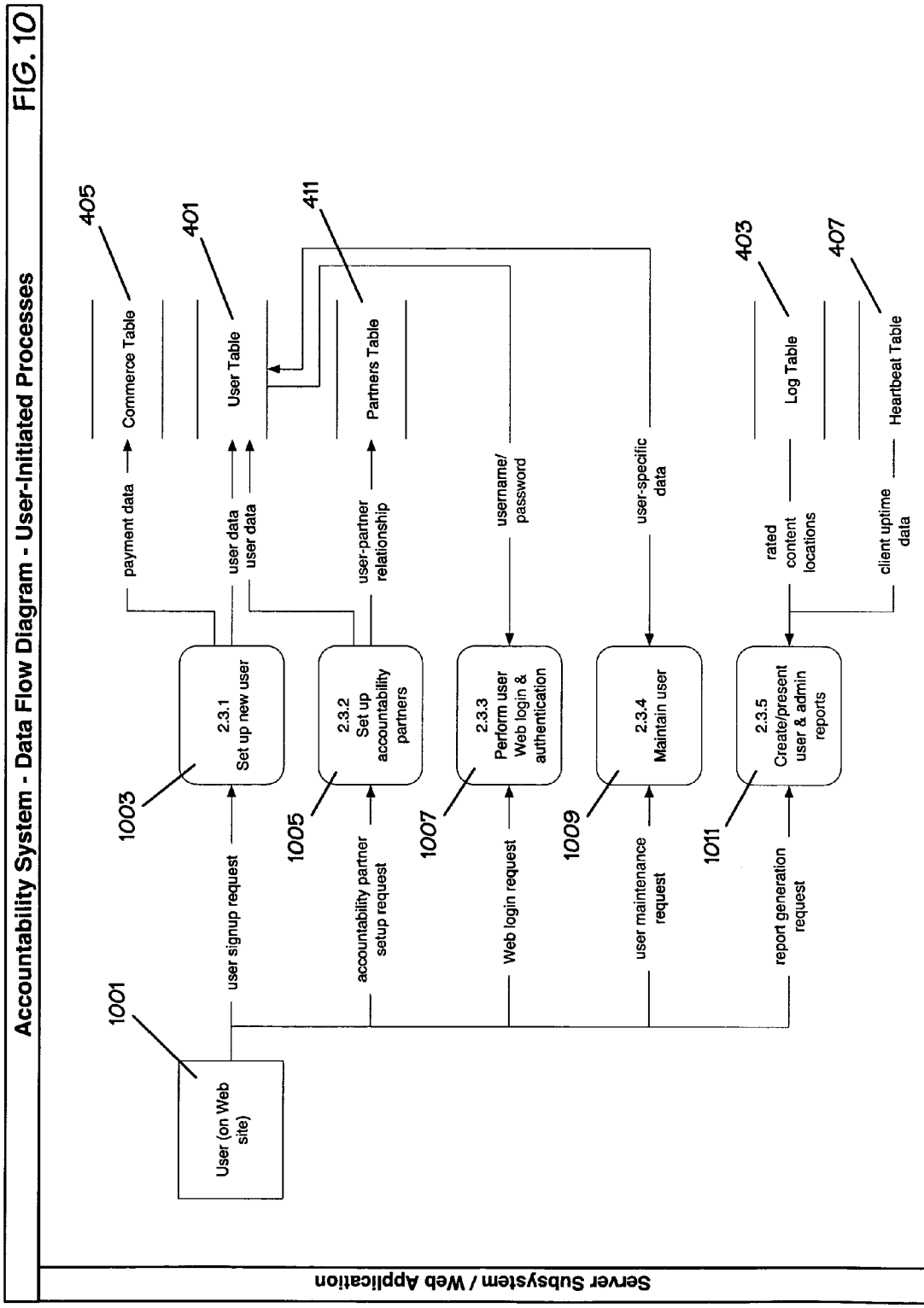

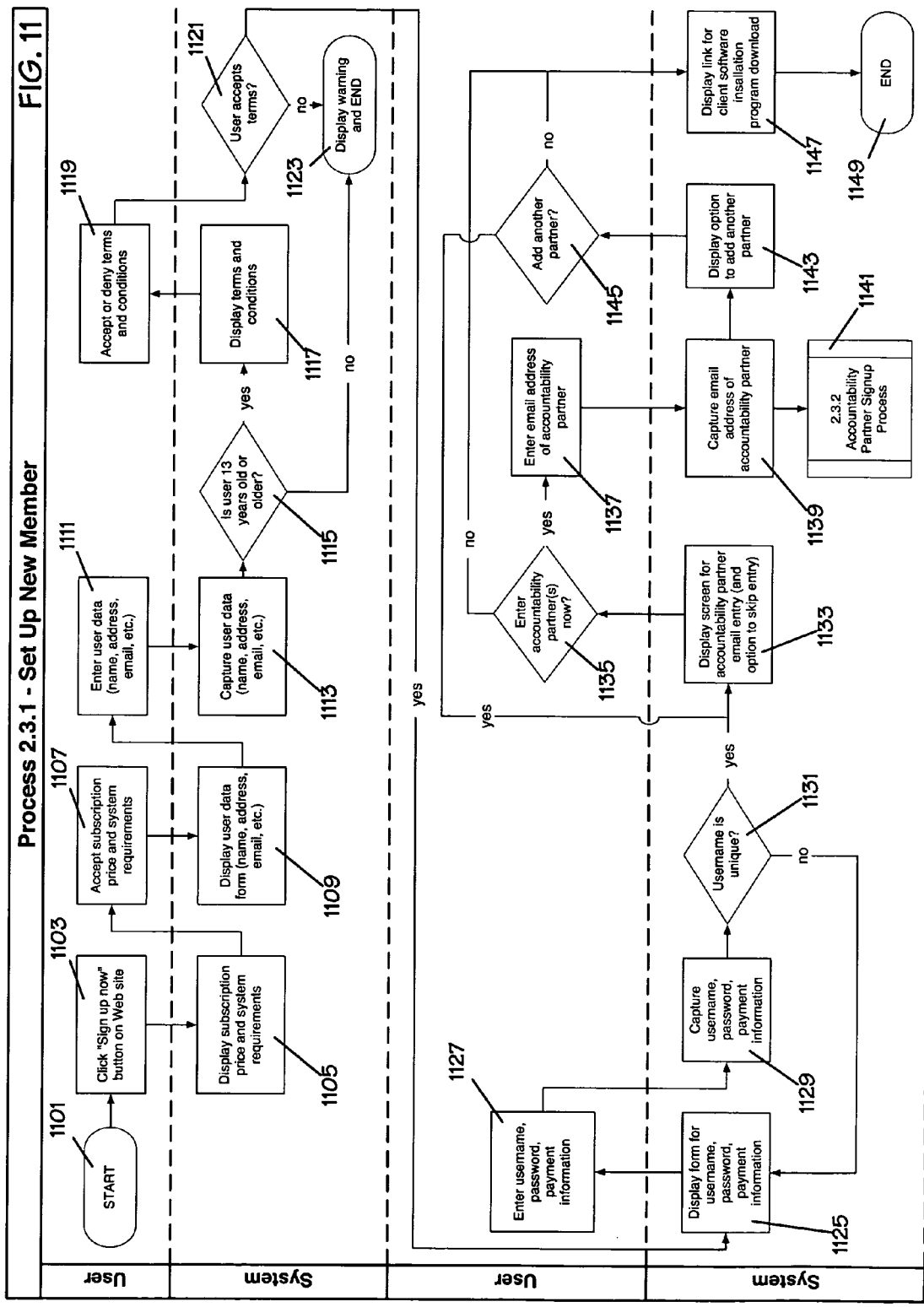

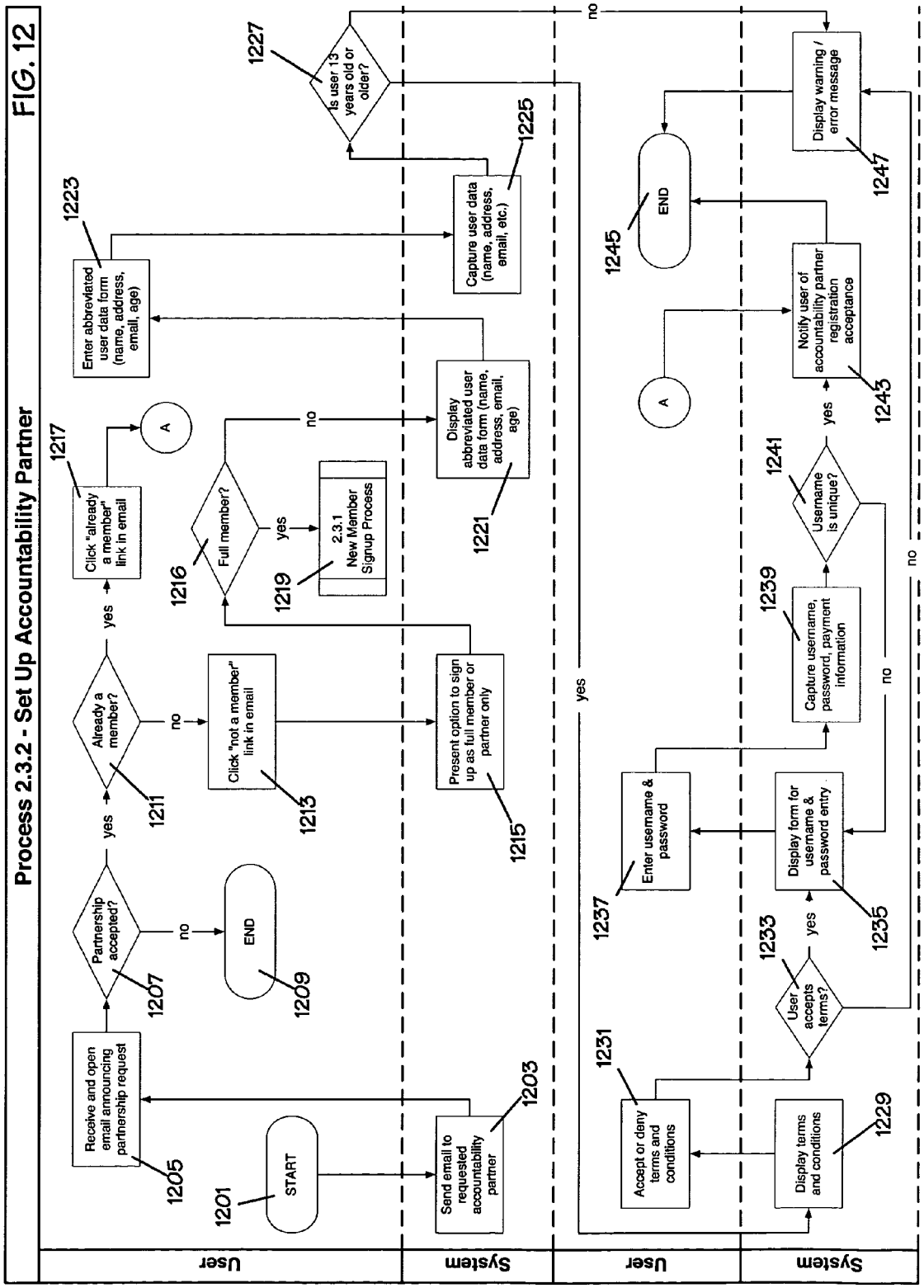

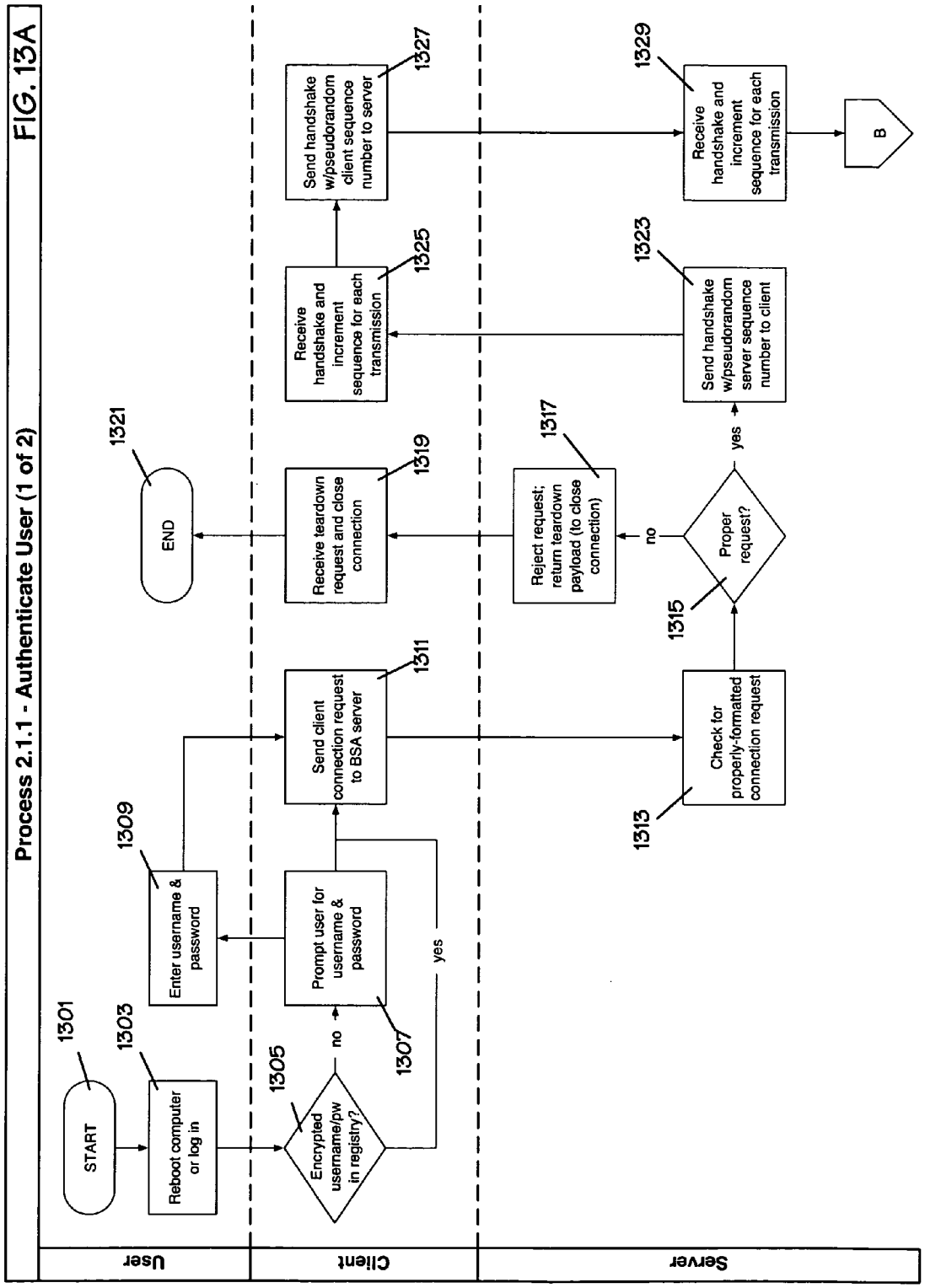

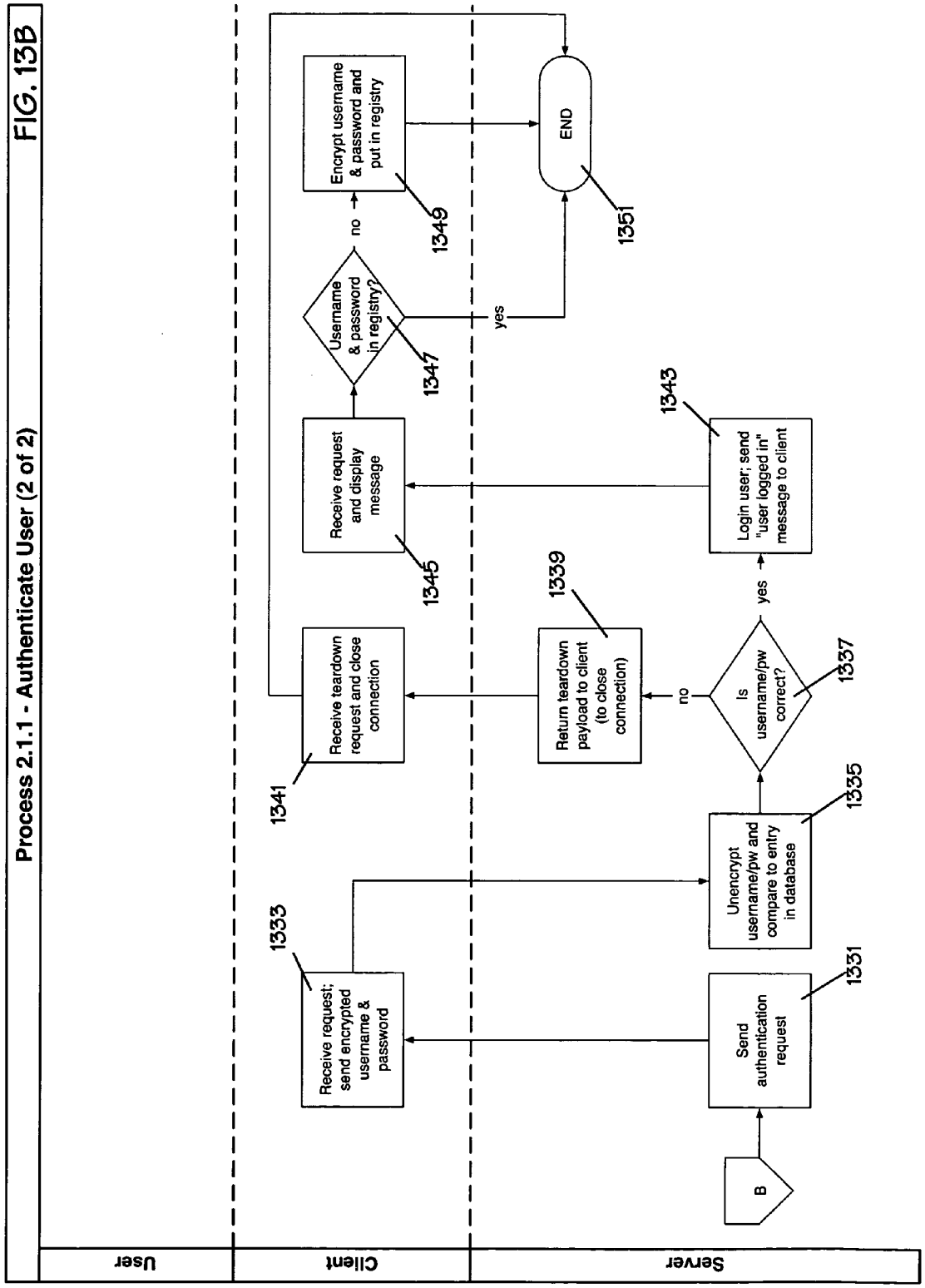

Accountability System - Multi-User Report

John Doe  LOGGED IN

MULTI-USER REPORT CONSOLE

Welcome to the Multi-user Console, where you can view NetAccountability log information for many users at once. Here we list the top 10 URLs for each person in your organization -- regardless of page ranking. In other words, these are the 10 worst -- but assuming that most of your users are keeping clean online, this in most cases will just be a list of the "least good". Each column can be sorted by clicking on that column's header -- and you can turn on and off the "URL listing" feature by clicking on the "-/-" at the top left of the list.

| FIRST NAME | LAST NAME | STATUS | |
|---|---|---|---|
| Allison | Connally | ☐ | ▶ VIEW DETAILED STATS |
| Mary | Smith | ☐ | ▶ VIEW DETAILED STATS |
| John | Trump | ☐ | ▶ VIEW DETAILED STATS |
| Martin | Hatcher | ☐ | ▶ VIEW DETAILED STATS |
| Walker | Humphrey | ☐ | ▶ VIEW DETAILED STATS |
| Kelley | Jordan | ☐ | ▶ VIEW DETAILED STATS |
| Barbara | Paulsen | | |

FIG. 28

Accountability System - Single User Report

SITES VISITED      PRINT

WEDNESDAY

| Start Time | Site | Machine ID | Rating |
|---|---|---|---|
| 01:55 PM | [+] ad.doubleclick.net [2] | Laptop | Not Rated ☐ |
| 04:06 PM | [+] ads.addesktop.com [5] | Laptop | Not Rated ☐ |
| 01:55 PM | [+] amch.questionmarket.com [3] | Laptop | Not Rated ☐ |
| 02:06 PM | [+] communications.msn.com [1] | Laptop | Not Rated ☐ |
| 03:03 PM | [+] down.plaxo.com [2] | Laptop | Not Rated ☐ |
| 01:55 PM | [+] m3.doubleclick.net [2] | Laptop | Not Rated ☐ |
| 01:48 PM | [+] news.google.com [8] | Laptop | Not Rated ☐ |
| 01:48 PM | [+] pagead2.googlesyndication.com [4] | Laptop | Not Rated ☐ |
| 09:26 AM | [+] sa.windows.com [6] | Laptop | Not Rated ☐ |
| 01:55 PM | [+] server-us.imrworldwide.com [1] | Laptop | Medium ■ |
| 01:48 PM | [+] update.adobe.com [1] | Laptop | Not Rated ☐ |
| 01:48 PM | [+] www.crosswalk.com [7] | Laptop | Not Rated ☐ |
| 04:06 PM | [+] www.csmonitor.com [1] | Laptop | Not Rated ☐ |
| 09:05 AM | [+] www.download.windowsupdate.com [1] | Laptop | Not Rated ☐ |
| 01:55 PM | [+] www.forbes.com [1] | Laptop | Not Rated ☐ |
| 04:53 PM | [+] www.naf.com [1] | Laptop | Not Rated ☐ |

FIG. 29

SYSTEMS AND METHODS FOR MULTI-LAYERED PACKET FILTERING AND REMOTE MANAGEMENT OF NETWORK DEVICES

CLAIM OF PRIORITY TO PROVISIONAL PATENT APPLICATION

This application claims the benefit of U.S. Provisional Patent Application Ser. No. 60/442,848, filed 24 Jan. 2003, entitled "Method of Providing Accountability Relationships." This provisional application is incorporated herein as if fully set forth.

BACKGROUND OF THE INVENTION

1. Field of the Invention

The present invention relates to implemented electronic multi-layered filtering AND accountability systems, and in particular to a method and apparatus which may be utilized collectively by a group in order to determine automatically the suitability of digital content consumed by individual members of the group. The present invention also relates to an extremely fast method and apparatus for searching textual digital content for selected words and phrases which may be utilized in any general, law enforcement, or employer surveillance of the consumption of digital content by particular individuals. The multi-layered filtering protection in this application also includes specific information on the following but is not limited to the following aspects: integrated internet protection (firewall with intrusion detection filtering, firewall, popup control, antivirus, reporting, Instant Message filtering and SPAM filtering and blocking), configurable software switch (service controlled and managed through configurable software switch, redundancy, failsafe, auto load balancing, managed services, auto updates, client and server side caching), VROUTING, multilayer (TDI and/or LSP and/ or NDIS and/or other layers), embedded code for physical devices, transparent tier 2 back-end support and distributed data mining. Additionally, the present invention has tested and plans to integrate image analysis to the series of data analysis components.

2. Description of the Prior Art

The internet has become a dominating source of obtaining information and media for many individuals. Unfortunately, the internet is also utilized by pornographers and individuals with ill intent to provide illicit and pornographic materials. It is generally believed that the ease of obtaining pornographic and illicit materials on the internet has resulted in individuals, who would not otherwise be involved with such illicit or pornographic materials, becoming more interested or even "addicted" to the illicit or pornographic materials. Not just limited to pornographic content—applies to any "questionable or potentially-deleterious" content.

SUMMARY OF THE INVENTION

It is one objective of the present invention to provide an improved system for filtering, blocking, monitoring and analyzing data on individual computers and/or networks of computers.

It is one objective of the present invention to provide modular analysis of client data whereby analysis components may be managed remotely and/or automatically on the client computer.

It is another objective of the present invention to provide a distributed data mining approach whereby various users' activities online would collectively help collect, analyze, categorize, and record information as a part of a distributed computing mechanism. This component aides in the speed and accuracy of analysis of web content to support and/or augment the client and/or server processing related to the accountability and filtering aspects of this method.

It is another objective of the present invention to provide special, simultaneous routing of packets of information to ensure there are not possible delays to the original requesting data in its transmission to its target. We refer to this type of special routing as VROUTING.

It is another objective of the present invention to provide rapid, multiple-analysis aspects for reviewing packets of data in real time or "near real time" as part of a "filter service" (including: real-time content rating algorithms (client and/or server), category file analysis, specific URL lists, Content Rating Engine(s), human review, and plug-ins for additional review capabilities "on the fly").

It is another objective of the present invention to provide integrated internet protection (firewall filtering with intrusion detection, popup control, antivirus, monitoring, reporting, instant messaging filtering, and SPAM filtering).

It is another objective of the present invention to provide configurable software switch (service controlled and managed through configurable software switch, redundancy, failsafe, auto load-balanced, managed services, auto updates, and client and/or server caching).

It is another objective of the present invention to provide multi-layer (TDI and/or NDIS and/or LSP and/or other socket) data packet analysis.

It is another objective of the present invention to provide code to be used in an embedded capacity as a part of a physical device such as a gateway, router, or "set-top box" electronic services appliance—whereby all or some aspects of monitoring and accountability and filtering and reporting would be deployed in a physical appliance or as part of a third party software or hardware bundle.

It is another objective of the present invention to provide transparent tier-2 backend support related to technologies supported and described in this patent application—for the purpose of providing users with seamless customer support initiated via electronic appliances (such as gateways, hubs, routers, switches, etc.).

It is another objective of the present invention to provide multi-user reporting with one line of information per user and an aggregate color-coded summary rating. Additionally, such information may be sorted by various components.

It is another objective of the present invention to provide specific information about the amount of time a user opened specific content.

It is one objective of the present invention to provide an improved system for allowing individuals and groups of individuals to establish accountability relationships which are useful for generating shared commitments to avoid undesirable digital materials.

It is another objective of the present invention to provide an improved computer-implemented system which provides a real time word-by-word analysis of digital content.

It is another objective of the present invention to provide a digital content analysis system which operates at least in part at the TDI layer of a personal computer system.

It is another objective of the present invention to provide a digital content analysis system which provides a content appropriateness rating after an automated analysis of the text portion of the content.

It is another objective of the present invention to provide a digital content analysis system which utilizes a client-server architecture to allow analysis and reporting of the patterns of consumption of digital content by designated users.

The above as well as additional objectives, features, and advantages will become apparent in the following description.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of the preferred embodiment when read in conjunction with the accompanying drawings, wherein:

FIG. 9 is a flowchart representation of a crawler application which is resident on the accountability server.

FIG. 10 is an overview flowchart.

FIGS. 11, 12, 13A and 13B are detailed flows of the processes depicted in high-level from in FIG. 10.

FIG. 28 is an exemplary multi-user report.

FIG. 29 is an exemplary single user report.

DETAILED DESCRIPTION OF THE INVENTION

Figure 1:
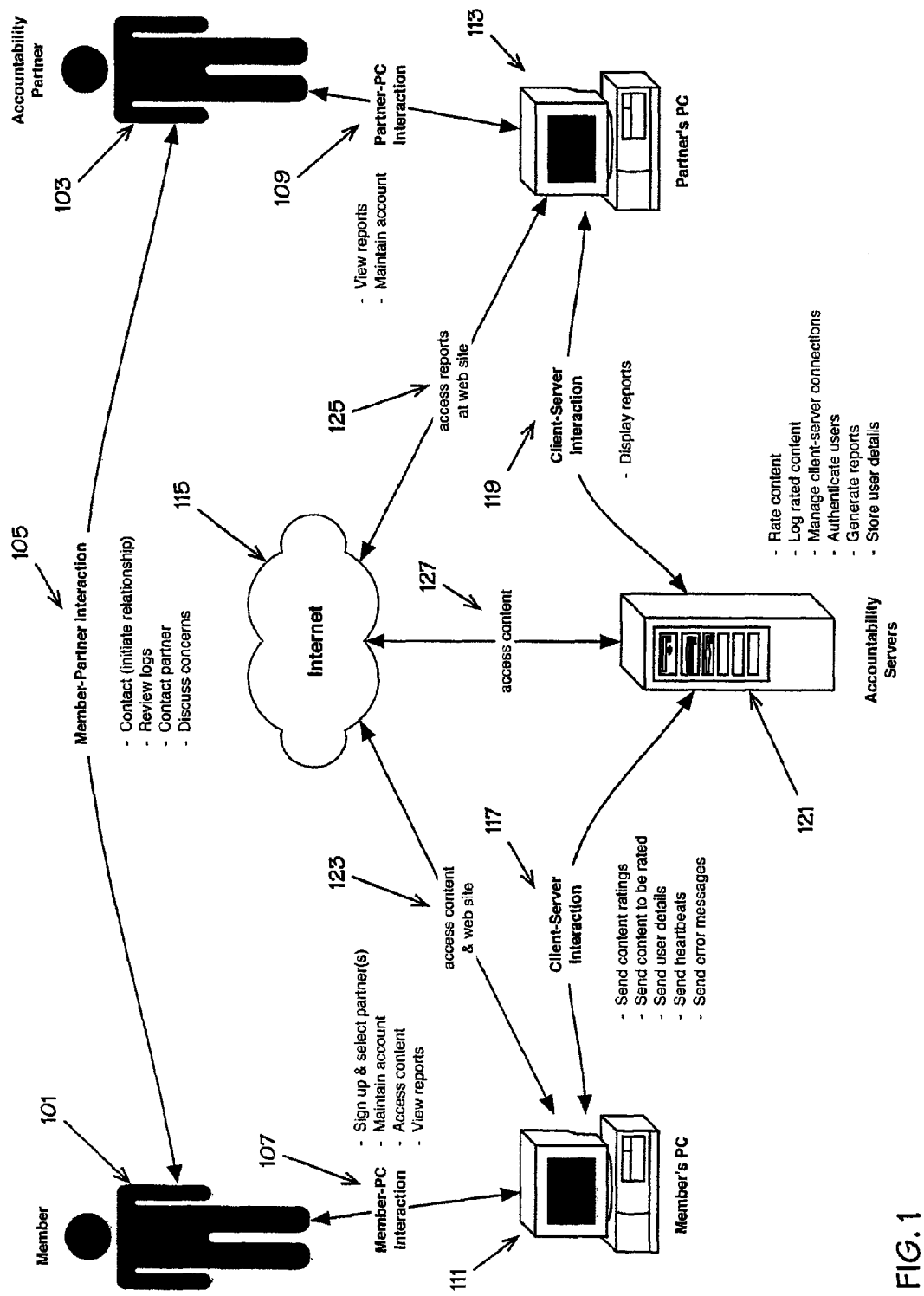
FIG. 1 is a simplified representation of the preferred method of the present invention of providing accountability between at least one "member" and at least one "accountability partner."

FIG. 1 is a simplified representation of the preferred method of the present invention of providing accountability between at least one "member" and at least one "accountability partner." As is shown in this figure, a member 101 engages in member-partner interaction 105 with an accountability partner 103. Member 101 has member-PC interaction 107 with member's personal computer 111. Member's personal computer 111 may be intermittently or continuously connected to a distributed data processing system such as the internet 115. Member's personal computer 111 is utilized for bi-directional communication 123 with internet 115. Additionally, member's personal computer 111 is adapted for client-server interaction 117 with an accountability server 121. The accountability server 121 also has bi-directional communication 127 with the distributed data processing system such as internet 115.

Similarly, accountability partner 103 has access to partner's personal computer 113. Partner-PC interaction 109 occurs between accountability partner 103 and partner's personal computer 113. Bi-directional communication 125 is established between partner's personal computer 113 and a distributed data processing system such as internet 115. Likewise, partner's personal computer 113 has bi-directional client-server interaction 119 with accountability server 121.

FIG. 1 illustrates a simplified situation in which a single member 101 has a single accountability partner 103. In actual practice, a single member 101 may have multiple accountability partners that have member-partner interaction, and that have accepted responsibility of receiving reports about member 101 and his or her access to illicit or pornographic materials. Likewise, any one accountability partner 103 may have member-partner interaction 105 with multiple members such as member 101. The present invention allows for a one-to-one relationship, a one-to-many relationship, or a many-to-many relationship.

In the preferred implementation of the present invention, the accountability method and apparatus is utilized to determine whether or not the digital content being accessed by member 101 includes sexual or pornographic words or materials. The basic concept of the present invention is that, if an internet user knows that his or her content is being summarized and reviewed by one or more accountability partners, then he or she will have better self control and avoid internet and other digital content which contains sexual or pornographic material. If there are multiple accountability partners, they provide a "safety net" for each individual member.

In accordance with the preferred implementation of the present invention, the member-partner interaction 105 includes the initial contact between member 101 and accountability partner 103.

Figure 14:
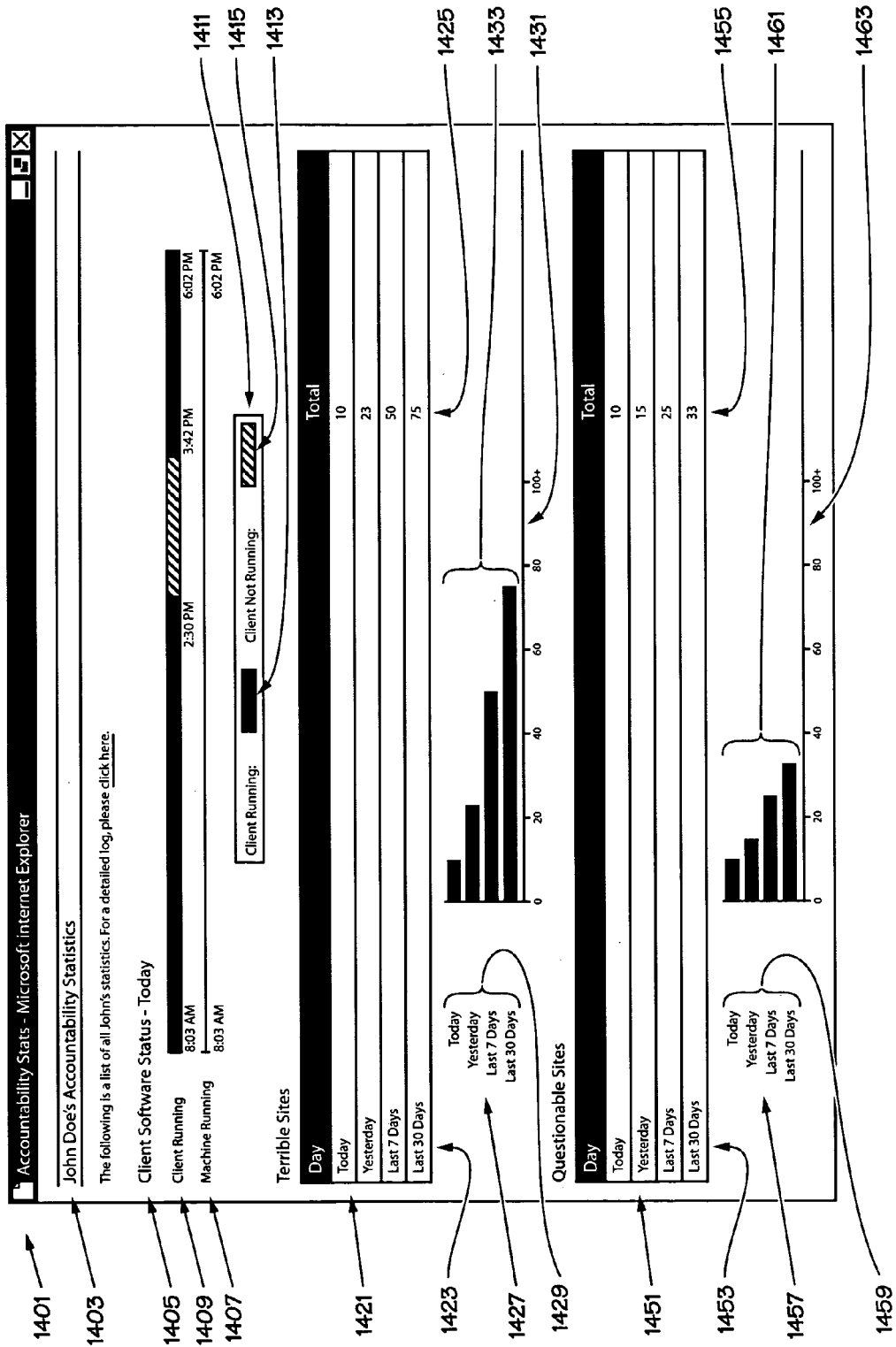
FIG. 14 is a pictorial representation of an exemplary report.
Figure 15:
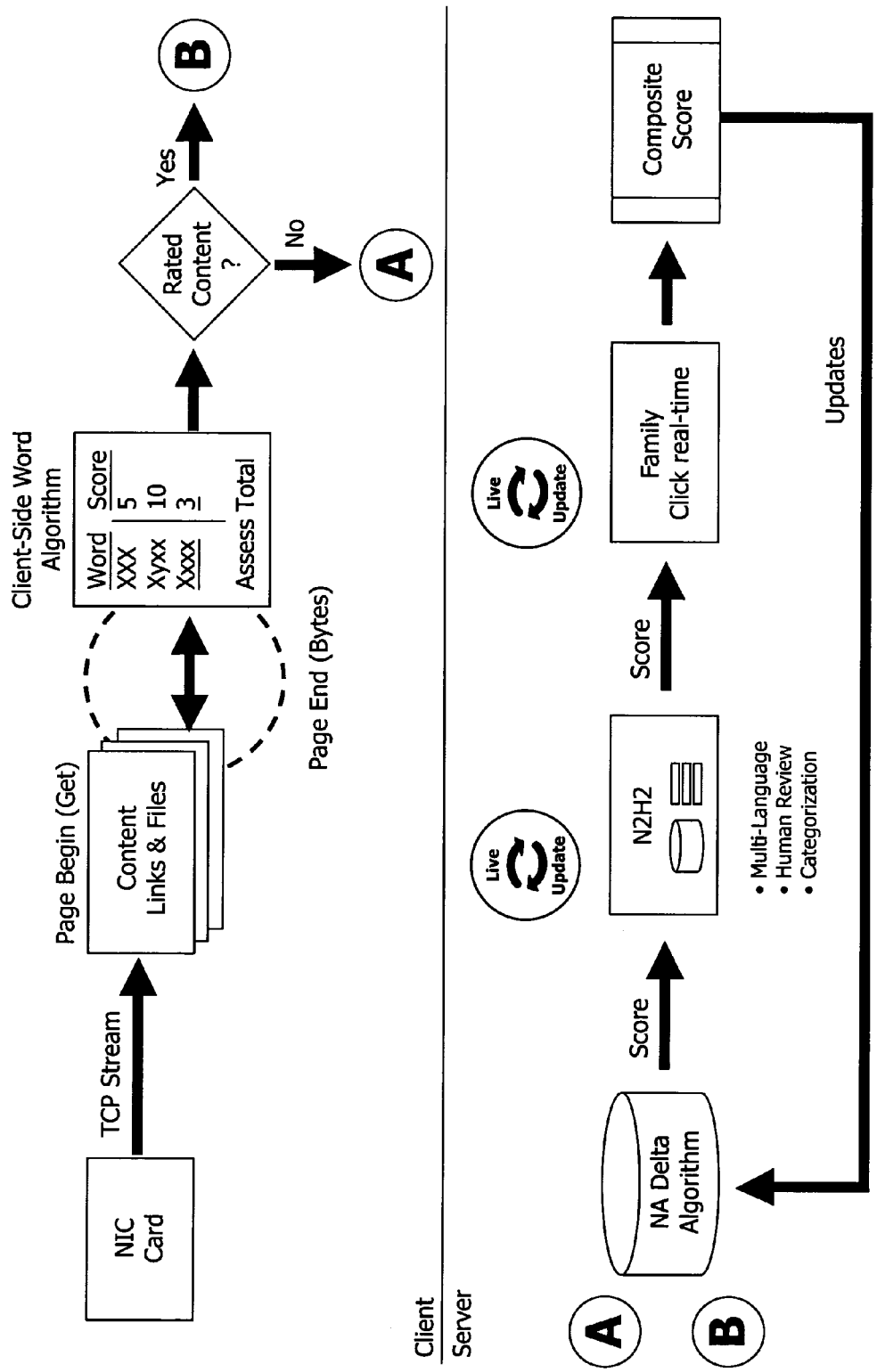
FIG. 15 is a pictorial representation of the technical process of the present invention.

FIG. 14 is a pictorial representation of an exemplary report. This figure will be described below in greater detail below; however, the accountability partner receives a summary of "terrible sites" and "questionable sites" which have been accessed by the member over predetermined time intervals. The information is graphically presented so that it can be understood quickly. In this particular implementation, no details are provided about the sites. A mere "rating" is provided for the sites. In alternative configurations and alternative embodiments, the present invention could provide reports which provide a greater or lesser amount of detail. Additionally, in alternative embodiments, the report could provide a greater amount of resolution than merely identifying sites as "terrible or prohibited" or "questionable." In the preferred implementation of the present invention, it is important that the accountability partner be able to intermittently access the report for the members, and review the reports quickly.

The member-partner interaction 105 of FIG. 1 includes the steps of initiating contact and establishing the partner relationship. It further includes review of the reports or logs by the accountability partner. If the accountability partner 103 determines that member 101 has strayed from their agreement and accessed illicit or sexual or pornographic sites, accountability partner 103 may contact the member 101 through e-mail, voice channels, or in person in order to reinforce the agreement between them concerning avoidance of inappropriate sites. The member 101 and accountability partner 103 may then discuss their concerns in order to correct the behavior of member 101.

In accordance with the preferred implementation of the present invention, member 101 utilizes member's personal computer 111 and bi-directional channel 117, preferably through internet 115 to communicate with accountability server 121. The member signs up for the service and selects one or more accountability partners. The member will need to maintain the account which includes meeting financial obligations associated with membership. Thereafter, member 101 will utilizes member's personal computer 111 to access internet 115 and to receive internet content. The content may include accessing internet sites utilizing URLs, which establishes continuous bi-directional stream of TCP/IP commands, along with text, images, and attachments or downloads.

In accordance with the preferred implementation of the present invention, a client application is resident on member's personal computer 111 which rates the digital content utilizing a proprietary word search algorithm which is describe herein. Bi-directional channel 117 (preferably through internet 115) is utilized to direct the digital content to member's personal computer 111. Server 121 will also send content ratings, error messages, and system heartbeats (all of this will be discussed in greater detail below).

Accountability server 121 is utilized to rate content, log the rated content, manage server-client connections, authenticate users, generate reports, and store user details.

Accountability partner 103 utilizes partner's personal computer 113 to access the reports. Preferably, bi-directional communication channel 119 is utilized to deliver the reports from accountability server 121 to partner's personal computer 113. Preferably, bi-directional communication channel 119 is internet 115.

Figure 2:
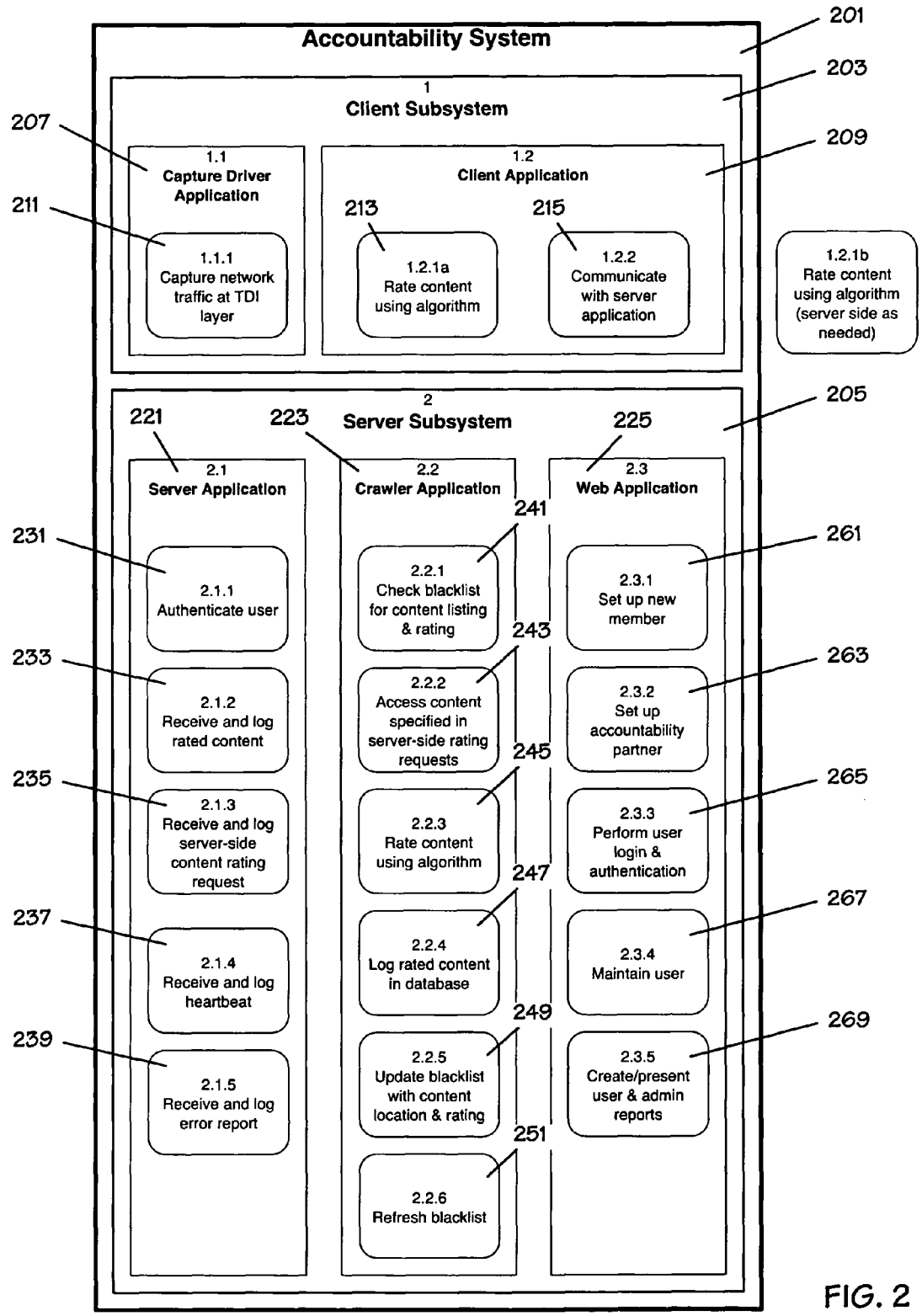
FIG. 2 is a functional decomposition for the preferred embodiment of the accountability system which may be considered as having two separate subsystems: a client subsystem, and a server subsystem.

FIG. 2 is a functional decomposition for the preferred embodiment of the accountability system 201 which may be considered as having two separate subsystems: a client subsystem 203, and a server subsystem 205. The client subsystem 203 includes one component which operates at the TDI layer in order to capture digital content from websites which are accessed by the client computer. In the view of FIG. 2, capture driver application 207 is shown as a subsystem of client subsystem 203. More specifically, functional element 211 is representative of the function of capturing network traffic at the TDI layer. Additionally, a client application 209 is also resident on client subsystem 203. It is composed of two functions. Function block 213 corresponds to the function of rating content using a proprietary algorithm. Function block 215 corresponds to the function of communicating with the accountability server application.

In broad overview, the client subsystem 203 then is composed of three basic functions. One function is the capture of network traffic. The second function is the rating of that network traffic using an algorithm. The third function is communications with the server application.

The server subsystem 205 is preferably composed of three distinct applications, each of which has numerous functional blocks associated therewith. These applications include server application 221, crawler application 223, and web application 225.

The server application 221 includes a number of functions which are represented by function blocks 231, 233, 235, 237, and 239. Function block 231 corresponds to the process of authenticating users. Function block 233 corresponds to the process of receiving and logging rated content. Function block 235 corresponds to the process of receiving and logging server-side content rating requests. Functional block 237 corresponds to the function of receiving and logging heartbeats. Function block 239 corresponds to the function of receiving and logging error reports.

The crawler application 223 is composed of a number of functions which are represented in the view of FIG. 2 as functional blocks 241, 243, 245, 247, 249, 251. Functional block 241 corresponds to the process of checking a blacklist for content listings and associated ratings. A blacklist is a list of sites which are known through prior experience to include inappropriate content. Function block 243 corresponds to the process of accessing the content specified in the server-side rating request. During this process, the server will access particular internet content in order to determine a rating. This stands in contrast with the client-side rating which is visually represented in the view of FIG. 2 as function block 213. In other words, in accordance with the preferred implementation of the present invention, there are two possible ways of obtaining a rating for content. One is accomplished at the client's site using the client's personal computer. The other is accomplished at the server's site utilizing the system's computers. Function block 245 corresponds to the process of rating content at the server-side utilizing the proprietary algorithm. Function block 247 corresponds to the function of logging rated content in the database. Function block 249 corresponds to the process of updating the blacklist with content location (such as URLs) and an associated rating. Function block 251 corresponds to the process of refreshing the blacklist. The refresh may be obtained through contact with third parties that have expertise in such rating, or may be accomplished by sequentially accessing sites which are identified on the blacklist, going to those sites, receiving content, and utilizing an algorithm to rate to the content.

Web application 225 includes a number of functional steps which are visually represented in the view of FIG. 2 as function blocks 261, 263, 265, 267, 269. Function block 261 corresponds to the function of setting up new members. Function block 263 corresponds to the process of setting up accountability partners. Function block 265 corresponds to the process of performing user log and authentication. Function block 267 corresponds to the function of maintaining users. Function block 269 corresponds to the process of creating and presenting user and administrative reports.

Figure 3:
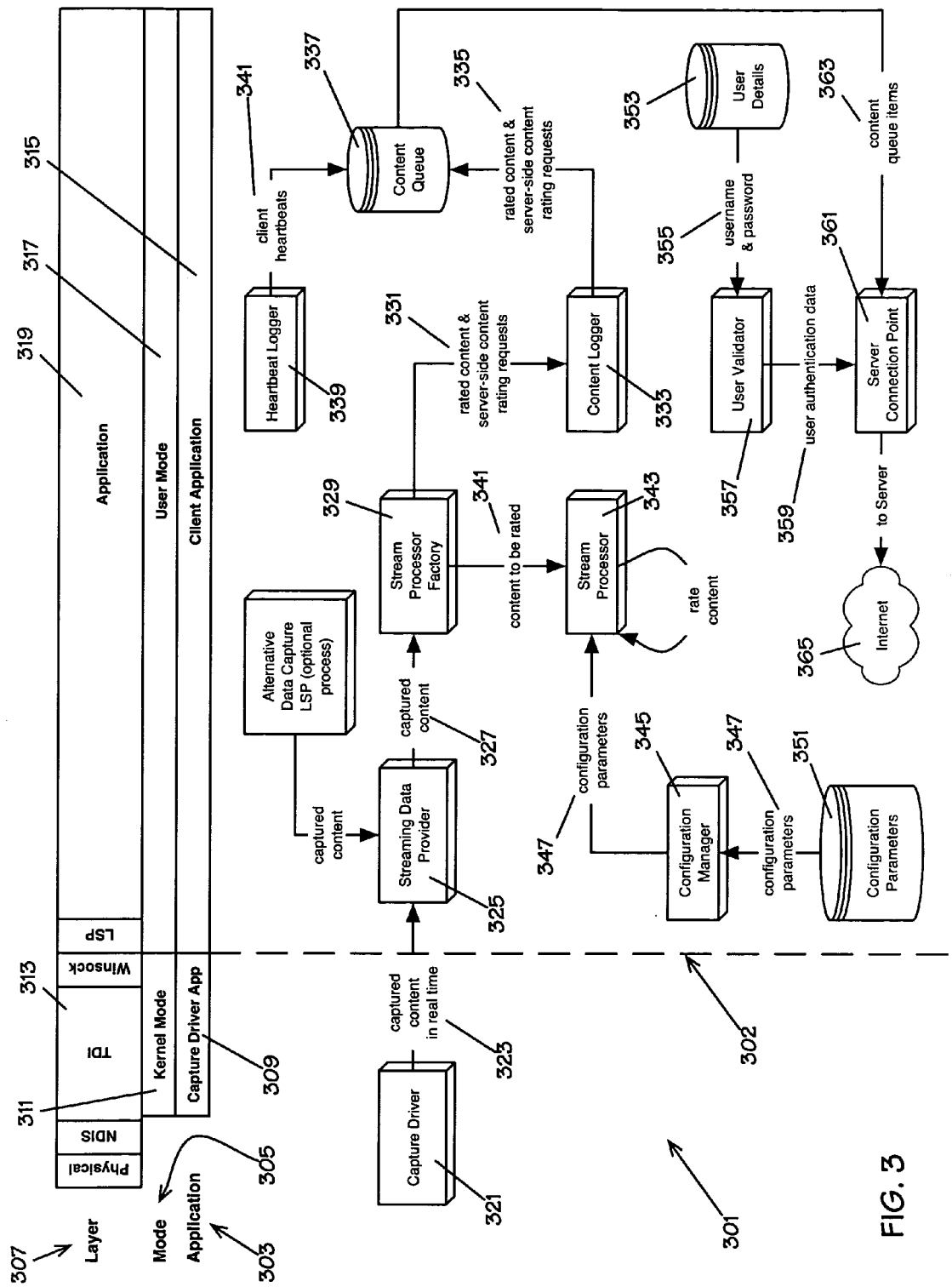
FIG. 3 is a block diagram representation of the client software architecture.

FIG. 3 is a block diagram representation of the client software architecture. This is a more detailed representation of the systems and processes of client subsystem 203 of FIG. 2. In the view of FIG. 3, the client software architecture 301 is shown in functional blocks which correspond to a particular applications 303, modes 305, and layers 307 of the personal computer under the control of a particular user. As is shown in this view, two distinct applications are provided. One is a capture driver application 309. The other is a client application 315. The client driver application 309 operates in kernel mode 311 while the client application 315 operates in user mode 317. The capture driver application 309 is in communication with the TDI layer 313 of the operating system. The TDI (Transport Driver Interface) layer is an interface by which TDI clients and transport providers interact. The TDI layer is shown in the view of FIG. 3 as having a relationship to the Winsock layer, the NDIS layer, and the physical layer.

In contrast, the client application 315 operates in user mode 317 which operates at application level 319. In the view of FIG. 302, the dashed line separates processes which are associated with the kernel mode 311 from processes which are associated with the user mode 317. The sole function performed at the kernel mode 311 is the capture driver 321 which operates to capture digital content which is being accessed by the personal computer, and to do so in real time. The captured content 323 is then passed from the capture driver application 309 operating in the kernel mode 311 to the client application 315 which is operating in the user mode 317. The captured content 323 may consist of any TCP/IP network traffic, including but not limited to data using the HTTP, SMTP, POP3, and/or NNTP protocols.

As is shown in the view of FIG. 3, streaming data provider 325 receives the captured content 323 from capture driver 321. Streaming data provider 325 operates in the client application 315 in user mode 317 at the application layer 319. Streaming data provider 325 receives the real-time captured content 323 and passes the data unaltered (as 327) to the stream processor factory 329.

The captured content 327 is provided to stream processor factory 329. The stream processor factory 329 performs two functions. The first function is the passing of content 341 which is to be rated to stream processor 343. Stream processor 343 includes the algorithm of the preferred embodiment which is utilized to do key-word searching on all of the text being received at the member's personal computer and accessed by the member through the internet. The second function is to communicate between messages to content logger 333. Two types of information are communicated between stream processor factor 329 and content logger 333. The first is the rating of content which has been rated by the client application. The second is a request for content ratings to be performed at the server. These are known as "server-side" content rating requests.

The content logger 333 communicates the content ratings and requests for server-side content ratings 335 to content queue 337. Content ratings which are performed at the client are done in accordance with an algorithm executed by stream processor 343. The parameters of the rating are known as configuration parameters 347. They are set by the program known as the configuration manager 345. The configuration parameters 347 are stored in memory 351 which is reserved for the configuration parameters 347.

Additionally, a heartbeat logger 339 generates client heartbeats 341 which are also communicated and recorded in the content queue 337. The content queue 337 pushes content queue items 363 to server connection point 361. Server connection point 361 communicates to the accountability server though internet 365.

When access is required of the client software, a validation program represented by user validation block 357 is utilized to check the user name and password 355 which are stored in memory 353.

Figure 4:
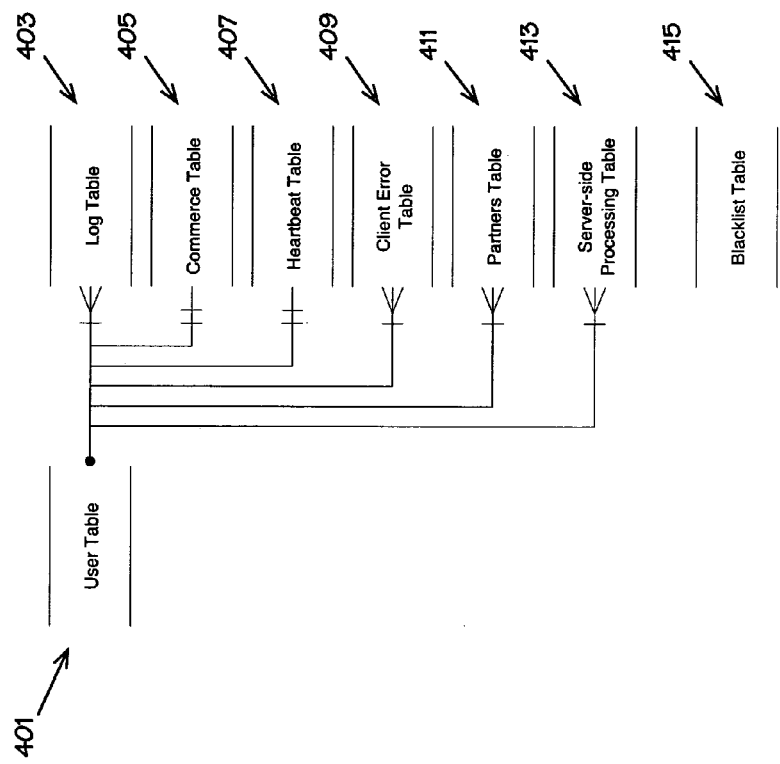
FIG. 4 is a simplified entity relationship diagram which shows the various databases which are utilized in accordance with the preferred implementation of the present invention.

FIG. 4 is a simplified entity relationship diagram which shows the various databases which are utilized in accordance with the preferred implementation of the present invention. As is shown, a variety of tables are provided including user table 401, log table 403, commerce table 405, heartbeat table 407, client error table 409, partners table 411, server-side processing table 413, and blacklist table 415. This simplified entity relationship diagram indicates the nature of the relationship between the tables. It utilizes conventional symbology to identify the relationship as either a one-to-one or a one-to-many relationship. For example, a relationship between a particular member's user table 104 has a one-to-one relationship with the commerce table 405 and the heartbeat table 407. In contrast, each member's user table 401 may have a one-to-many relationship with the log table 403, the client error table 409, partner's table 411, and server-side processing table 413. Of course, the blacklist table 415 is the same for all members so there is no particular relationship between a member's user table 401 and a blacklist table 415. The utilization of these databases will be described in detail below.

Figure 5:
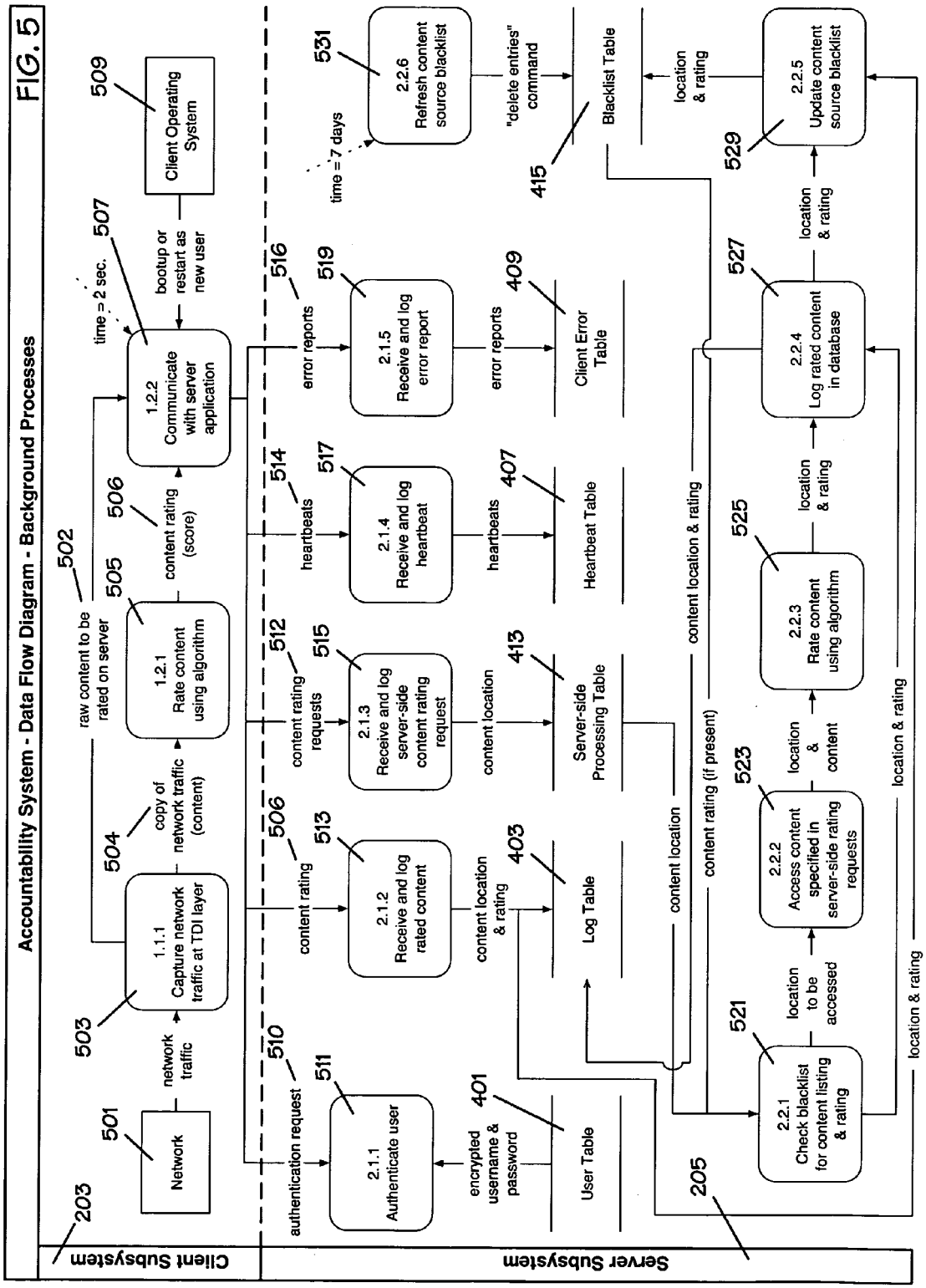
FIG. 5 is a flowchart representation of the background processes in accordance with the preferred implementation of the present invention.

FIG. 5 is a flowchart representation of the background processes in accordance with the preferred implementation of the present invention. This figure includes blocks which correspond to operating steps. The figure is divided into two parts. One part is representative of client subsystems 203, while the other part is representative of server subsystems 205.

As is shown, the user interacts with a network 501, which is preferably, but not exclusively, the internet. In accordance with block 503, the client subsystem captures network traffic at the TDI layer. In accordance with the preferred implementation of the present invention, some of the network traffic is rated at the client subsystem 203. Other types of content are passed "raw" and un-rated to the server subsystem 205. As is shown, raw content 502 may be passed to block 507 for communication with server subsystem 205. A copy 504 of the network traffic is passed to block 505 which is representative of the step of rating content utilizing the proprietary algorithm of the present invention. The content rating 506 is also passed to block 507 for communication to the server subsystem 205. In the view of FIG. 5, block 509 is representative of the client operating system which is utilized to boot-up or re-start the modules of the present invention which are resident on the client subsystem 203.

Authentication requests 510 which are received from client subsystem 203 are passed to block 511, wherein the user is authenticated. Block 511 receives the encrypted user name and password from user table 401. Content ratings generated at block 505 of client subsystem 203 are passed to block 513, wherein they are received and logged. The content location and associated ratings are copied to log table 403. Requests for content rating 512 are passed to block 515. These are requests for rating of raw content. Accordingly, in accordance with block 515, they are received and logged on the server side. The content location is passed to the server-side processing table 413. It is passed subsequently to block 521, wherein the content location is checked against a content blacklist to determine whether or not there is a preexisting rating for this content.

If it has been previously rated, control passes to block 527, wherein the rated content is logged into the database of log table 403. If the content has not been previously rated, the location information is passed to block 523, wherein the content is accessed by the server subsystem 205. The location and content is then passed to block 525, wherein the content is rated utilizing the proprietary algorithm of the present invention. The location and rating information is then passed to block 527, wherein it is logged in log table 403. Additionally, the location rating information is passed from block 527 to block 529, wherein the location and rating information is passed to blacklist table 415. In accordance with block 531, the blacklist table 415 is periodically (preferably approximately every seven days) refreshed with blacklist location and rating information.

In accordance with the present invention, server subsystem 205 also receives heartbeats 514 from client subsystem 203. These heartbeats are received at block 517 and are received and logged to heartbeat table 407. Additionally, error reports 516 which are received from client subsystem 203 are also received by server subsystem 205 at block 519, wherein they are received and logged to client error table 409.

Figure 6:
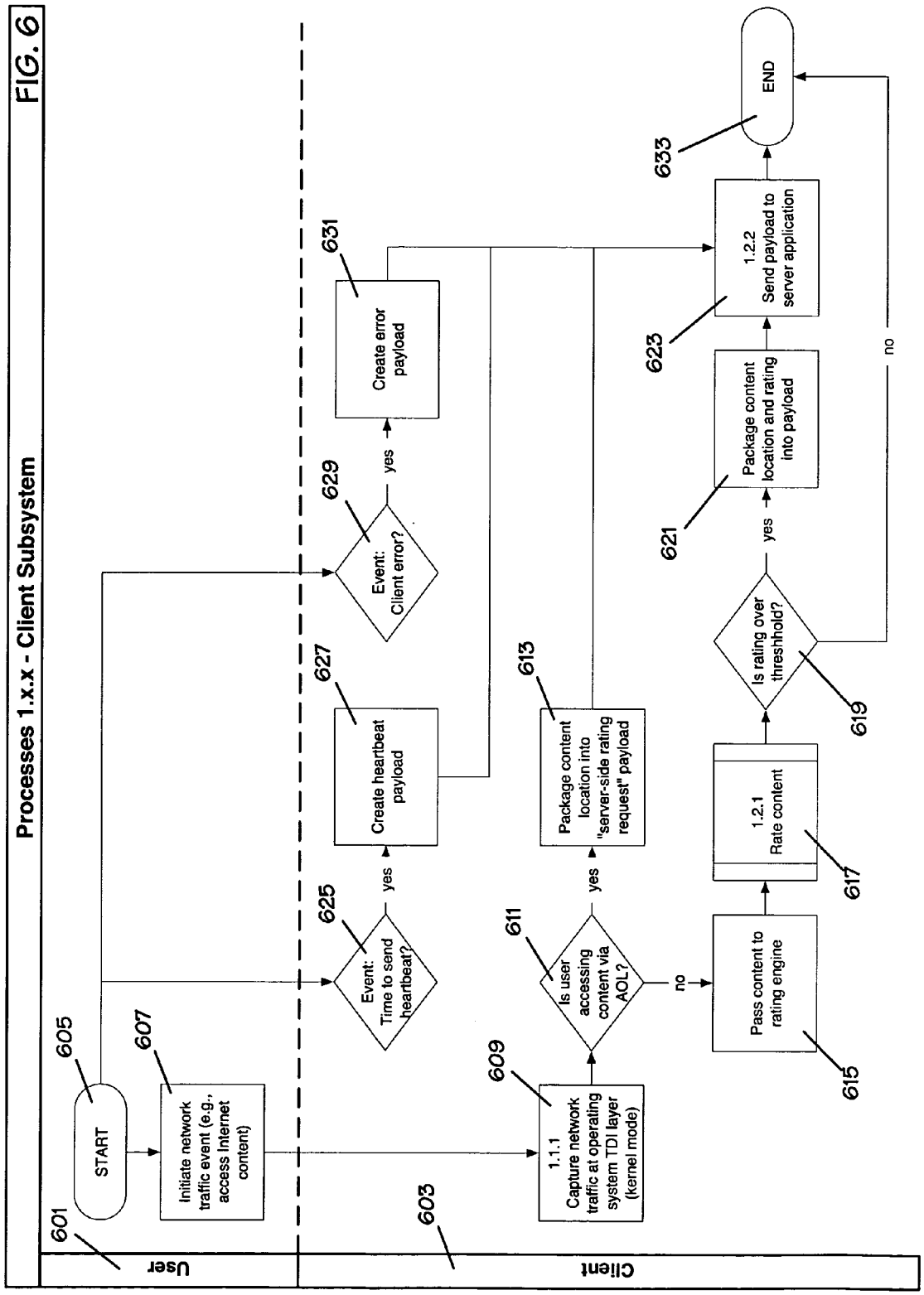
FIG. 6 is a flowchart representation of the operations performed at client subsystem.

FIG. 6 is a flowchart representation of the operations performed at client subsystem 203. This figure is divided into two parts. The first part corresponds to activities which are preformed by user 601. The second part corresponds to activities which are preformed by the client application 603. The dashed line in this figure separates user activities from client activities. As is shown, the process starts at block 605. In accordance with block 607, the user 601 initiates network traffic events, such as accessing internet content. In accordance with block 609, the client application captures network traffic at the operating system TDI layer. This is also known as the "kernel" mode.

Next, in accordance with block 611, the client application determines whether or not the user 601 is accessing content utilizing America On Line as an internet service provider or browser. This is important as the content accessed through America On Line cannot be rated at the client application level and must be passed to the server level for rating at the server. Accordingly, a branching operating occurs. If the user is utilizing America On Line, control passes to block 613, wherein the content location is packaged into a "server-side rating request" payload, and control then passes to block 623 wherein the payload is sent to the accountability server application. However, if in step 611 it is determined that the user 601 is not utilizing America On Line, control passes to block 615, wherein the content is passed to the rating engine. In accordance with block 617, the content is then rated utilizing the algorithm of the present invention.

In accordance with block 619, the content rating is examined to determine whether or not it is over or under a rating threshold. Items which are "over" the threshold are determined to be inappropriate or questionable. Items which have a rating which are under the threshold are determined to be innocuous. If the rating threshold is not exceeded, control passes to block 633 and the process ends. However, if it is determined in step 619 that the rating threshold has been exceeded, control passes to block 621, wherein the content location and rating is packaged into a payload. Control then passes to block 623, wherein the payload is sent to the accountability server for further processing. Control then passes to block 633, wherein the process ends.

While the user 601 is "consuming" network content, a heartbeat is generated in accordance with block 625. The initiation of network traffic starts a heartbeat clock. In accordance with block 625, the clock is utilized to determine whether or not it is time to send a heartbeat. If it is time to send a heartbeat, control passes to block 623, wherein a heartbeat payload is created. Control then passes to block 623, wherein the payload is sent to the accountability server application.

Additionally, in accordance with the present invention, the client application 603 is also monitoring for client error events in accordance with block 629. Once a client error occurs, control passes to block 631, wherein an error payload is created. Control will then pass to block 623 wherein the payload is sent to the accountability server application.

In this manner, rated content, raw and un-rated content, heartbeat, and error reports are all sent from the client 603 to the accountability server application for further processing.

Figure 7:
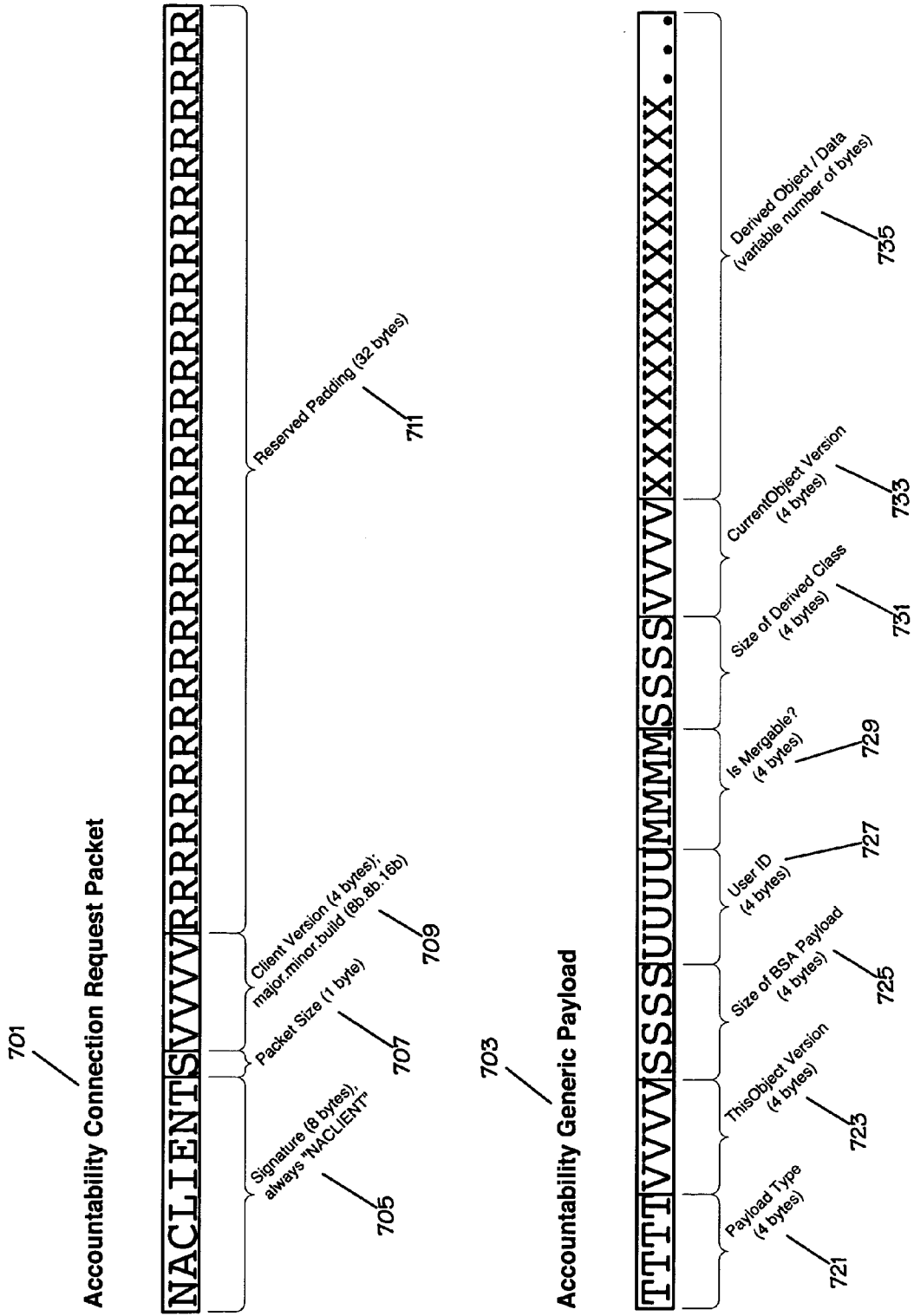
FIG. 7 illustrates two types of packets which are generated in accordance with the preferred and present implementation of the present invention.

FIG. 7 illustrates two types of packets which are generated in accordance with the preferred and present implementation of the present invention. Alternative or improved payload packages may be utilized in alternative embodiments. There are two basic types of packages. The first is a connection request packet 701. The second is a generic payload 703.

Connection request packet 701 is made up of a number of bits which correspond to a signature 705. This is followed by a packet size bit 707. This is a followed by a client version indicator 709. Reserve padding bits 711 are also provided for, and may be used in other implementations to pass other types of information.

The generic payload 703 is made up of a payload type byte 721, an object version byte 723, a payload size byte 725, the user ID 727, a mergeable status byte 729, a drive class size byte 731, a current object version 733, and the derived object/data 735 which may be variable in length. In this manner, the type of the payload is identified. The version of the object is identified. The size of the payload is identified. The other information about the payload, such as whether or not it is mergeable, its derived class size, and the current object version are also identified. In this manner, the size and type of payload may be specified by this information.

Figure 8:
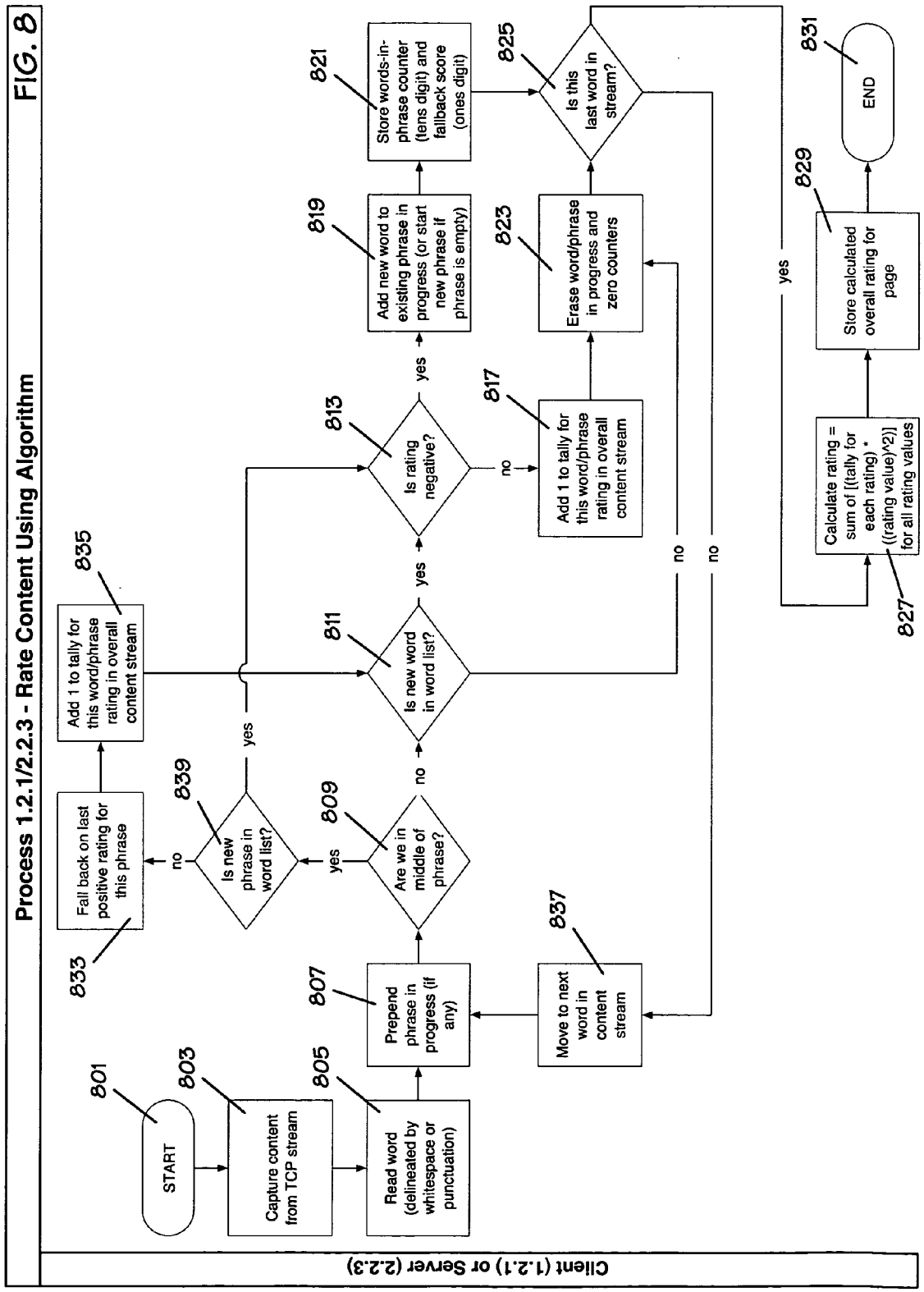
FIG. 8 is a flowchart of the preferred rating process of the present invention.

The preferred rating process will now be described with described with reference to FIG. 8. The process starts at block 801, and continues at block 803, wherein the digital content is captured from the TCP stream in accordance with block 803. Next, in accordance with block 805, the next word is "read." As stated above, the algorithm of the present invention evaluates text on a word-by-word basis. Words are delineated by white space or punctuation.

As stated above, in the preferred rating system of the present invention, the tens column indicates the number of words in a phrase. The number is negative if the particular word is the start or beginning of a multiword phrase. As the algorithm moves through a multi-word phrase, the negative value is changed to a positive value In accordance with block 807, the program determines whether a pre-pend phrase is in progress. Control passes to block 809, where it is determined whether or not the algorithm is looking at a word which is in the "middle" of a phrase. If so, control passes to block 839; if not, control passes to block 811.

In accordance with block 839, the program will determine if the new phrase is in the word list. If so, control passes to block 813; if not, control passes to block 833. In accordance with block 813, the program determines whether or not the rating is "negative." In accordance with block 833, the program "falls back" on the last positive rating for this phrase. In other words, if the algorithm is in the middle of a phrase, and a new phrase is not on the word list, the program defaults to the last "positive" rating for this phrase. Next, control passes to block 835, wherein the program adds one to a tally for this word/phrase rating in the overall content stream.

If it is determined in block 809 that the algorithm is not in the middle of a phrase, control passes to block 811, wherein the program determines if this is a new word in the word list. If it is indeed a new word, control passes to block 813, wherein the program determines whether or not the rating is negative. If it is determined in block 813 that the rating is negative, control passes to block 819, wherein the new word is added to an existing phrase in progress, or the start of a new phrase, if the phrase is empty.

If it is determined in block 813 that the rating is not negative, control passes to block 817 wherein one is added to the tally for this word/phrase rating in the overall content stream.

Control passes from block 817 to 823. In block 823, the word/phrase which is currently being evaluated and held in memory is erased and the counter is set to zero.

Then, control passes to block 825, wherein the program determines whether or not this is the last word in the content stream.

If it is not the last word in the content stream, control passes to block 837, wherein the program moves to the next word in the content stream. The next word is then evaluated in accordance with the described process. However, if it is determined in block 825 that it is the last word in the content stream, control passes to block 827, wherein a rating is calculated for the website or page.

The rating for the web page is equal to the tally for each rating times the square of the rating value for all rating values. Next, in accordance with block 829, the calculated overall rating for the page stored in memory and process ends at block 831.

If it is determined in block 813 that the rating is negative, control passes to block 819, wherein a new word is added to the existing phrase in progress, or the start of a new phrase if the phrase is empty. Next, control passes to block 821, wherein the rating associated with the phrase is stored in memory. More particularly, in accordance with block 821, the score is a two digit number. The values in the ten's place indicate the number of words in the phrase. A phrase having four words would have a value in the ten's column of four. A phrase having three words would have a value in the ten's column of three. The value of the one's column indicate the overall rating for the phrase. Once the new phrase and the rating value is recorded in memory, control passes to block 825 wherein the program determines whether or not the last word in the digital stream has been evaluated. If additional words exist in a stream, control then passes to block 837. However, if it is indeed the last word in a stream, control then passes to block 827, wherein a rating is calculated for the website or page, as described above. Next, in accordance with block 829, the calculated overall rating for the page is stored and the process ends at block 831.

FIG. 9 is a flowchart representation of a crawler application which is resident on the accountability server. It is utilized to review and rate content which cannot be rated at the client subsystem 203 of FIG. 2. At present, content which is accessed utilizing the America On Line website and/or browser cannot be rated at the client application level and must be passed to the server for analysis and rating.

The process starts at block 901 and continues at block 903, wherein content location information (such as URLs) is retrieved from the server-side processing table. Then, in accordance with block 905, the content location information is compared to a blacklist table. In accordance with block 907, the program determines whether or not the location has already been blacklisted. If the location has been blacklisted, control passes to block 917 wherein the rated content is logged in the database. More specifically, it is tagged to the member who accessed it. However, if it is determined in block 907 that the location has not already been blacklisted, control passes to block 909. In accordance with block 909, the server accesses the content which is identified in the rating request. More specifically, it utilizes the web URL to access the particular internet page. Then, in accordance with block 911, the content is rated utilizing the rating algorithm discussed above and depicted in FIG. 8.

In accordance with block 913, the program determines whether or not the rating is over a predetermined threshold. If the rating is not over the threshold, control passes to block 921, wherein the process ends. However, if it is determined in block 913 that the rating is indeed over the specified threshold, control passes to block 915, wherein the blacklist is updated with the content location and the calculated content for the content. Then, control passes to block 917, wherein the rated content is logged in the database.

FIGS. 10 through 13B are flowchart representations of a variety of user-initiated processes. FIG. 10 is an overview flowchart. FIGS. 11, 12, 13A and 13B are detailed flows of the processes depicted in high-level from in FIG. 10.

With reference first to FIG. 10, in accordance with block 1001, the user utilizes his or her personal computer to access the website for the accountability program. The user may sign up as a new user, set up an accountability partner, request a log in, request maintenance, and generate reports. In accordance with block 1003, the program responds to the user's request for signing up as a new member. Block 1003 passes payment information to commerce table 409. Additionally, it passes user data to user's table 401. In accordance with block 1005, the user may set up an accountability partner. Block 1005 passes user data to user table 401. Additionally, block 1005 passes user-partner relationship information to partner table 411. Alternatively, in accordance with block 1007, the user may perform user web-based log in and authentication. In accordance with block 1007, user name and password information is received and validated against user table 401. In accordance with block 1009, the user may request maintenance. Block 1009 receives user-specified data from user table 401. In accordance with block 1011, the user may create and/or present user and administrative reports. Block 1011 receives rated content location information from log table 401. Additionally, block 1011 receives client uptime data from heartbeat table 407.

FIG. 11 is a flowchart representation of block 1003 of FIG. 10 which corresponds to setting up a new member. The view of FIG. 11 separates the flowchart elements by dashed lines which separate activities performed by the user from activities performed by the system. The process starts at block 1101. It continues at block 1103, wherein the user selects or "clicks" on the "sign-up" now button on the website. In response to this command, in accordance with block 1105, the system displays the subscription price and system requirements. Then control passes to block 1107, wherein the user is prompted to accept the subscription price and system requirements. After the user accepts the subscription price and system requirements, control passes to block 1109, wherein the system displays the user data from. This form is utilized to gather name, address, and e-mail information from the user. In accordance with block 1111, the user enters the data into the user data form. Once the form is completed, control passes to block 1113, wherein the system captures the user data and records it to a database.

In accordance with block 1115, the system analyzes the information on the data form to determine whether or not the user is thirteen year's old or older. If the user is not thirteen year's old or older, control passes to block 1123, wherein a warning is displayed and the process ends. However, if the user is thirteen year's old or older, control passes from block 1115 to block 1117, wherein the terms and conditions of membership are displayed. In accordance with block 1119, the user is prompted to accept or deny the terms and conditions.

Once the user accepts the terms and conditions, control passes to block 1121. The system determines whether or not the terms have been accepted. If the terms have not been accepted, control passes to block 1123, wherein a warning is displayed and the process ends. However, if it is determined in block 1121 that the user has accepted the terms and conditions, control passes to block 1125, wherein a form is displayed prompting a user to select a user name, and password and to provide the payment information.

Control then passes to block 1127, wherein the user enters the user name and password, and also provides the payment information. Control then passes to the system in accordance with block 1129, wherein the system captures the user name, password, and payment information. Control then passes to block 1131, wherein the system determines whether or not the user name is unique. If the user name is determined to not be unique, control returns to block 1125 and the user is required to select a new user name. However, if it is determined in block 1131 that the user name is unique, then control passes to block 1133.

In accordance with block 1133, the system displays a screen for entry of the accountability partner e-mail. Control then passes to block 1135, wherein the user is asked whether or not he or she wants to enter the accountability partner information at this time. If the user elects not to enter the accountability information, then control passes to block 1147 which causes the display of a link which allows the downloading of the client software. If the user elects to enter the accountability partner information in block 1135, then control passes to block 1137, wherein the user enters the e-mail address of the accountability partner. Control passes to the system in accordance with block 1139 wherein the system captures the e-mail address of the accountability partner. Then, the system displays to the user the option to add another partner in accordance with block 1143. Control passes to the user in block 1145 permitting the user to add another partner. If the user elects to add another partner, control returns to block 1133. However, if the user elects not to add another partner, control passes to block 1147 which displays the link for downloading the client software. The process ends at block 1149.

FIG. 12 is a flowchart representation of the process utilized to set up accountability partners in accordance with the preferred embodiment of the present invention. In this view, the activities of the user are separated from the functions of the system by dashed lines.

The process starts in block 1201, and continues in block 1203, wherein the system sends an e-mail to the requested accountability partner. In accordance with block 1205, the potential accountability partner receives the e-mail and opens the e-mail. The e-mail includes text which announces to the potential accountability partner that he or she has been selected by a user. The potential accountability partner must make a decision about whether or not he or she will serve as an accountability partner for the user. This decision is depicted in block 1207. If the potential accountability partner elects not to serve as an accountability partner, the process ends at block 1209. However, if the potential accountability partner agrees to serve as an accountability partner for the user, then he or she must identify to the system whether or not he or she is already signed up as a member. This is depicted in block 1211. The potential accountability partner is presented with a link. This is depicted in block 1213. The link indicates that the potential accountability partner is "not a member." Alternatively, as set forth in block 1217, the potential accountability partner may also click on an alternative link which indicates that he or she is already a member. If he or she is already a member of the accountability system, control then passes to block 1243 wherein the user is notified that the potential accountability partner has accepted the registration and responsibility of serving as an accountability partner, and the process ends in accordance with block 1245.

In event that the potential accountability partner is not a member, in accordance with block 1215, the system presents the potential accountability partner with the option to sign up as full member or as an accountability partner only. Block 1216 represents the presentment of the option to become a full member to the potential accountability partner. If he or she elects to become a full member, then control passes to the new member sign up process as depicted by block 1219. Alternatively, if he or she elects not to become a full member, control passes to block 1221, wherein the accountability partner is presented with an abbreviated user data form. This form gathers the name, address, e-mail and age of the accountability partner. Block 1223 represents the presentation of this form to the user. After the form is completed, the data on the form is captured in accordance with block 1225.

Block 1227 is representative of the determination of whether or not the potential accountability partner is thirteen years old or older. If the potential accountability partner is not at least thirteen years old, control passes to block 1247, wherein a warning and error message is displayed. In accordance with the commercial implementation of the present invention, individuals must be thirteen years old or older in order to serve as accountability partners. If it is determined in accordance with block 1227 that the potential accountability partner is thirteen years or older, then control passes to block 1229, wherein the system displays the terms and conditions of the accountability relationship. Block 1231 represents the acceptance or denial of the terms and conditions by the potential accountability partner. Block 1233 represents the determination by the system as to whether or not the terms and conditions have been accepted. If the terms and conditions have not been accepted, control passes to block 1247, wherein a warning and error message is displayed. However, if the terms and conditions have been accepted, control passes to block 1237, wherein the system displays the form for the entry of the user name and password.

Block 1237 represents the activities of the user in entering the user name and password. Block1239 represents the capturing of the user name, password, and payment information. The system determines in block 1241 whether or not the user name is unique. If the user name is not unique, control then turns to block 1235 wherein the user is prompted to select an alternative user name. However, if the user name is unique, control passes to block 1243, wherein the accountability system member is notified that the accountability partner has registered acceptance. The process then ends in accordance with block 1245.

FIGS. 13A and 13B depict in flowchart form the process of authenticating a user. Like the previous figure, this figure utilizes dashed lines to separate actions and functions which are preformed by the user, the client, and the server.

The process commences at block 1301. It continues at block 1303, wherein the user either reboots his or her computer or logs in. In accordance with block 1305, the client application then determines whether or not the encrypted user name and password are stored in the Windows registry (or other configuration file). If so, control passes to block 1311, wherein the client application sends a connection request to the accountability server. If it is determined in block 1305 that the encrypted user name and password are stored in the Windows registry (or other configuration file), control passes to block 1307, wherein the client application prompts the user to enter a user name and password. Block 1309 is representative of the user activity of entering the user name and password.

Control is then passed to block 1311, wherein the client sends a connection request to the accountability server.

In accordance with block 1313, the accountability server checks to determine whether or not the connection request is properly formatted. Then, in accordance with block 1315, the server determines whether or not the request for connection is proper. If not, control passes to block 1317, wherein the server rejects the connection request and returns a "tear down" payload in order to close the connection. Then, the client application would receive the tear down request and close the connection in accordance with block 1319. The process would then end at block 1321.

However, if it is determined in block 1315 that the connection request is proper, the server will then send a handshake utilizing a pseudo random server sequence number to the client application. In accordance with block 1325, the client application will receive the handshake and increment the sequence for each transmission. Next, in accordance with block 1327, the client application will send the handshake with the pseudo random client sequence number back to the server. In accordance with block 1329, the server receives the handshake increments the sequence for each transmission.

Next, in accordance with block 1331, the server application sends an authentication request to the client application. In accordance with block 1333, the client application receives the request and sends an encrypted user name and password back to the server application. As set forth in block 1335, the server application unencrypts the user name and password and compares the unencrypted data to entries in the database. Block 1337 is representative of the process by which the server determines whether or not the user name and password are correct. If the user name and password are not correct, in accordance with block 1339, the server application sends a tear down payload to the client in order to close the connection. The client receives the tear down connection in accordance with block 1341 and closes the connection. The process then ends at block 1351.

If it is determined in block 1337 that the user name and password are correct, the system logs the user in and sends a message to the client application that the user is logged in. In accordance with block 1345, the client application receives the request and displays the message to the user. Next in accordance with block 1347, the client application determines whether or not the user name and password are stored in the Windows registry (or other configuration file). If so, control passes to block 1351, wherein the server application ends the process. If it is determined in block 1347 that the user name and password are not recorded in memory, then in accordance with block 1349, the client application encrypts the user name and password and records it in the registry (or other configuration file). Then, the process ends at block 1351.

FIG. 14 is an example of one type of report which may be generated utilizing the present invention. The internet page 1401 includes identification information 1403 for the member. While more detailed reports are available, the page depicted in 1401 represents an exemplary summary page for John Doe's accountability and statistics. Three basic types of information are provided. The first type of information is a comparative representation of the amount of time that John Doe's computer was running on the day in question as compared to the amount of time that the client application was running on John Doe's computer. This allows the accountability member to determine what time intervals, if any, that John doe has been operating his computer with his client accountability software application turned off.

As is shown in the view of FIG. 14, a title 1405 is provided which states "client software status-to-date." Two graphs are provided. Graph 1407 indicates the times that John Doe's machines was running. In the example of FIG. 14, his machine was running from 8:03 a.m. until 6:02 p.m. Next to this graph is a graph 1409 which indicates the times that the client application was running. In the view of FIG. 14, a legend 1411 is provided which provides two graphical codes. Code 1411 indicates the times the client application was running, while code 1415 indicates the times that the client application was not running. In the example of FIG. 14, it is evident that John Doe disabled his client application from 2:30 p.m. until 3:42 p.m. At all other times, the client application was running. This information allows the accountability partner to determine whether or not John Doe has been disabling the client application which is resident on his computer. This might indicate that he utilized this time to access inappropriate sites and is seeking to avoid detection. Once the client application is disabled, it is not possible for the system to monitor the appropriateness or inappropriateness of the internet sites access by John Doe.

In the view of FIG. 14, additional graphical information is provided. One set of information provides summary of the "terrible site" access by John Doe. Additionally, another set of information identifies the "questionable sites" accessed by John Doe. Whether or not a site is "terrible" or "questionable" is determined by its rating as described above. The information on the "terrible" and "questionable" sites is presented in two different forms.

Table 1421 identifies the terrible sites. Column 1423 indicates the time interval. In the example of FIG. 14, the time intervals include today, yesterday, the last seven days, and the last thirty days. For each time interval, the total number of terrible sites which have been accessed by John Doe are indicated by Column 1425. In the example of FIG. 14, in the last seven days John Doe has accessed fifty "terrible" sites. In contrast, on the day in question, John Doe has accessed ten "terrible" sites.

The same information is presented in bar graph 1427. The time intervals 1429 are provided on the y-axis, and the number of "terrible" sites are provided on the x-axis. Bars 1433 identify the number of "terrible" sites accessed by John Doe in the particular time interval in question. This is a basic histogram bar graph which is an alternative of presenting the same information of table 1421.

In the example of FIG. 14, the "questionable" sites are also identified in two forms. Table 1451 is provided which includes a time interval column 1453 and a total column 1455. The same time intervals may be utilized, including today, yesterday, the last seven days, and the last thirty days. In the example of FIG. 14, John Doe accessed thirty-three "questionable" sites in the last thirty days. In contrast, John Doe accessed fifteen "questionable" sites yesterday.

The same information is provided in the histogram bar graph 1457. The time intervals 1459 are provided on the y-axis. The number of "questionable" sites is provided on the x-axis. Bar graph elements 1461 indicate the total number of "questionable" sites accessed by John Doe in the relevant intervals. Once again, the table 1451 and the histogram bar graph 1457 are alternative ways of providing the same information to the accountability partner.

The report is simple and intuitive. It allows the accountability partner to review only summaries of the number of "terrible" and "questionable" sites. It does not permit the accountability partner to access the materials which have been accessed by the member. This summary format allows the accountability partner to not be involved in reviewing the materials which have been accessed by the members. He or she only accesses the summary of the ratings of the sites. This allows the accountability partner to be involved in the support of the member without forcing him or her to view this material or to make independent value decisions about the appropriateness or inappropriateness of the materials. In other words, the accountability partner must have some confidence that the rating system provided by the accountability system is accurate. He or she need not get involved in a time consuming effort to independently review the digital materials consumed by the other member.

In broad overview and in accordance with the preferred embodiment of the present invention, accountability partners receive internet-accessible reports which summarize the nature and quantity of inappropriate or "prohibited" internet sites.

Figure 16:
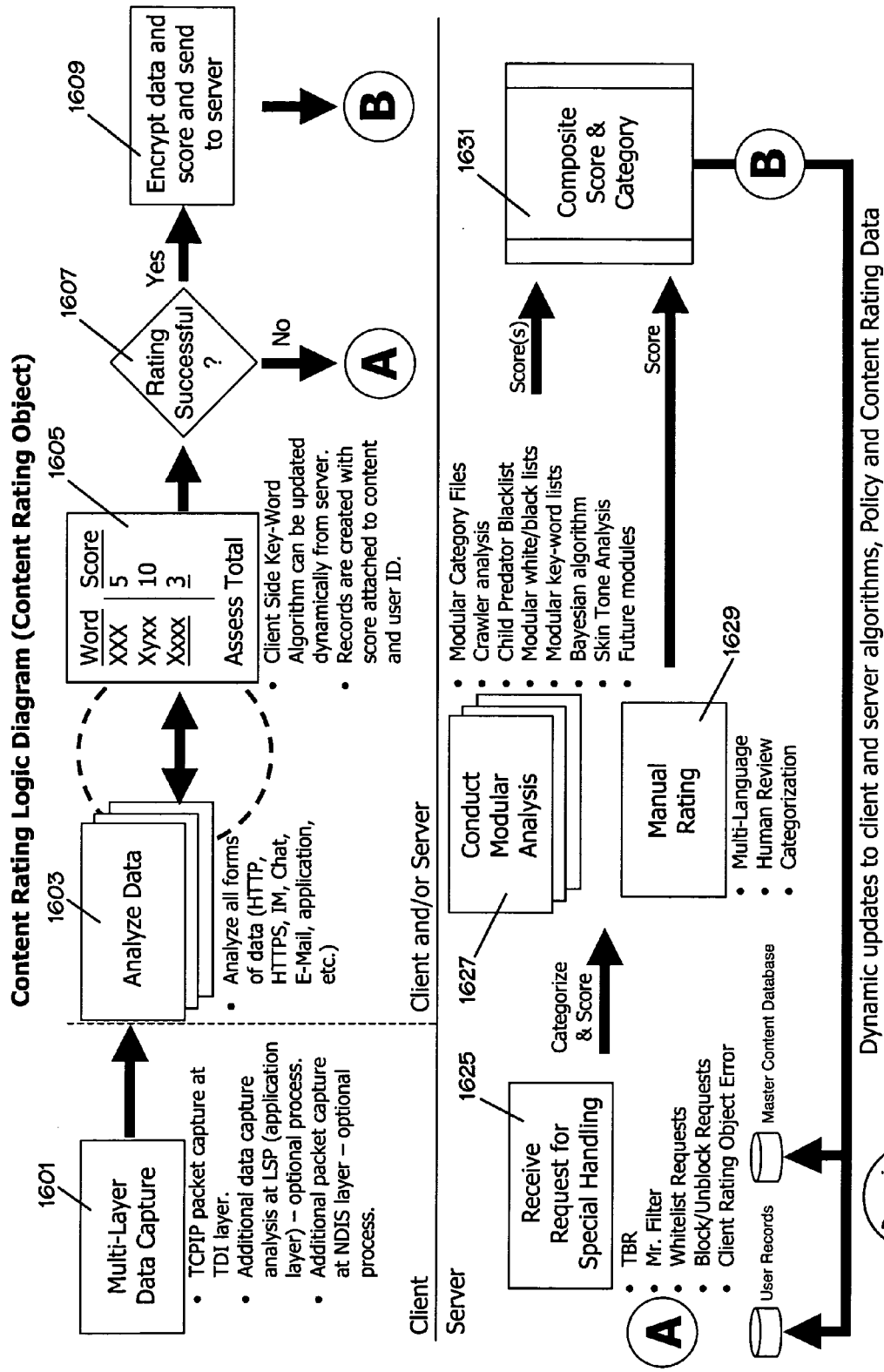
FIG. 16 is a process flow of an alternative content rating system.

FIG. 16 depicts an alternative content rating process. In block 1601 the multi-layer data is captured. In block 1603, the data is analyzed and a score 1605 is generated for the content. In accordance with block 1607, if the rating is successful, the process continues at block 1609 wherein the data and the score are encrypted and sent to a server. If the rating is not successful, in block 1607, control is passed to block 1625, wherein a request for special handling is sent and received. This content is subjected to either or both of (1) an automated modular analysis in accordance with block 1627 and (2) a manual rating in accordance with block 1629. The modular analysis can include units such as "skin tone analysis" which reviews images for colors found in skin (and thus present in a large amount in pornography) and child predator black lists which are generated for known predators (from conviction records). The manual review may include actual human review, and foreign language analysis.

Figure 17:
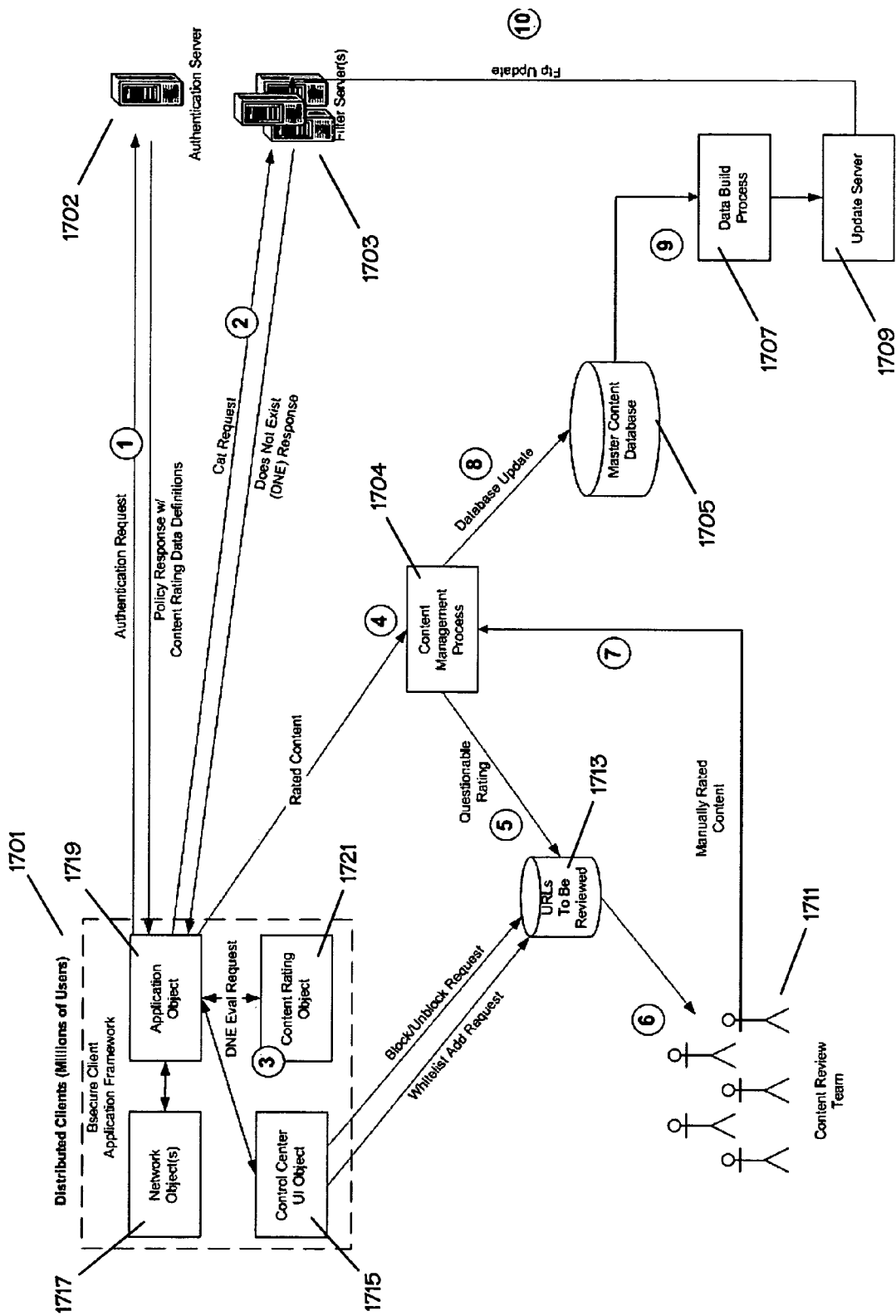
FIG. 17 depicts a process flow of a system for distributed data mining and content rating.

FIG. 17 depicts a system for distributed data mining and content rating The system provides for a mechanism and a process to find and determine different types of content available on the Internet using distributed client systems (millions of systems) to find, search and classify content type.

The following is an overview of the preferred embodiment of the process:

Step 1: Client applications 1701 are distributed to a large number of users. The client application includes and application object 1719, network objects 1717, control center objects 1715, and a content rating object 1721. The distributed thin client applications 1701 contact a backend Authentication Server ("AS") 1702 for authentication of the account and service, along with user policy information, and a targeted list of keywords to be used by the "Content Rating" engine 1721 within the client application 1701.

Step 2: The client application 1701 makes a request to some URL and the thin client application 1701 checks the remotely managed Filter Server ("FS") 1703.

Step, 3: If FS 1703 returns back a does-not-exist ("DNE") response, the system commands the onboard "Content Rating Engine" 1721 to rate the content using automated techniques (such as the techniques described above) and assigns a rating score. The URL, Content Type and score are then sent to our backend systems which then determine what to do with it at Step 4.

Step 4: The Content Management Process 1704 decides if the content being sent is accurate enough for inclusion into the Update List and later to the Master Content Database 1705. If the content rating meets some measure it will automatically place it into an Update List.

Step 5: If the automated rating doesn't meet a predetermined standard the content is pushed it to a To Be Reviewed (TBR) database 1713. The data gets added to TBR database 1713 along with incoming block/unblock and white-list requests (such as Mr. Filter requests and White-list Requests from Characterlink brand content monitoring).

Step 6: The site review TEAM 1711 will review the sites and categorize them accordingly.

Step 7: The human review data is included in the Update List for inclusion into the Master Content Database 1705.

Step 8: The updated data will be pushed to the "Master Content Database" 1705 where it will be available for the next upload process.

Step 9: The updated Master Content Database 1705 will be packaged for delivery to the distributed Filter Servers 1703.

Step 10: The packaged data will be uploaded to each FS 1703 in the network on a daily basis.

Figure 18:
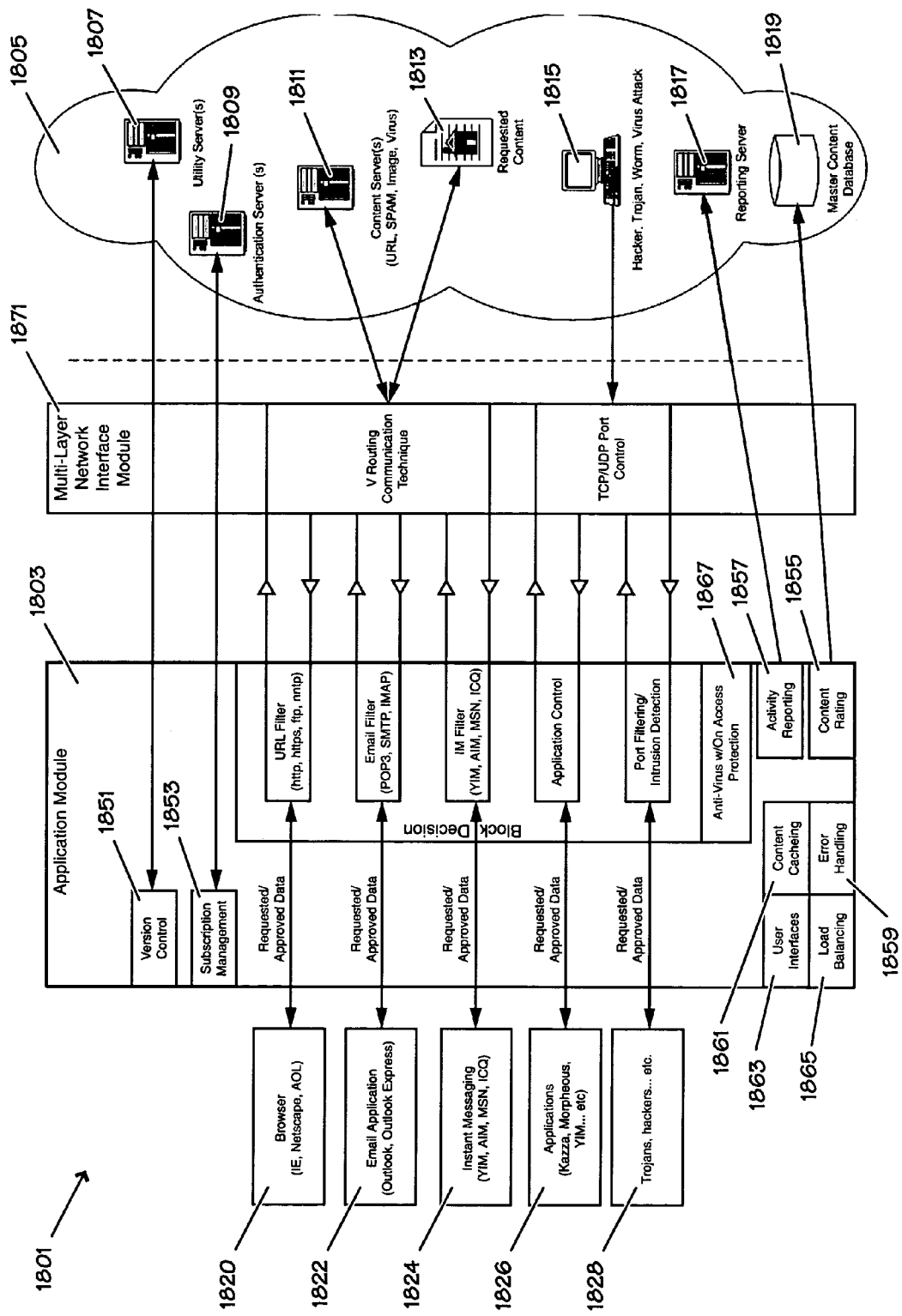
FIG. 18 depicts integrated internet protection services package.

FIG. 18 depicts an integrated service platform which provides, in addition to content rating, filtering, firewall, popup control, anti-virus, instant messaging filtering, spam filtering, and reporting. The (BSECURE brand) Internet Protection Services platform 1801 is made up of a multi layered client application 1803 which interfaces to backend service provisioning systems 1805. All of these components work together to deliver managed Internet protection services to millions of customers, on any networking device and through any delivery channels. These services can be delivered to personal computers, embedded networking appliances, and mobile network based devices. The protection services are continually updated on backend systems to deliver up-to-date protection for the differing types of threats. The following is an overview of the process:

At startup the client application 1803 interfaces with our backend authentication system 1809 and reads the 'serverlist.xml' file which defines all available service delivery systems in the network. Each system in the list is polled to determine its response rate. The quickest responding servers are identified for future use as primary servers and the subsequent quickest servers are identified as secondary and tertiary servers.

The client based application 1803 interfaces directly to primary backend authentication systems 1809 to verify service configuration and account status. It connects to the authentication server 1809 and requests account policy information. If the requesting client system is identified as a valid account holder, the user's service policy, configuration settings, content rating keyword list and any other account specific information is transferred through direct socket connections in Extensible Markup Language (XML) formatted data.

The client (embedded or non-embedded) application 1803 then configures itself to provide the services that are subscribed to according to the user's unique policy. This XML based policy definition is managed and controlled at the backend service delivery systems to ensure user information is kept up to date, can be configured from any system on the Internet and can be used by any device on the Internet with the appropriate account ID and password. Every protection feature of the BSECURE brand Internet Protection platform is configurable through this XML based policy. Content rating definitions are also controlled and defined through this interface for the distributed content rating system.

The delivery service network ensures that each requesting client application 1803 will always have service delivery systems available to it. The client system 1803 can logically balance its work load to most available delivery system servers and immediately switch to another system in the network if there is a network or system problem that interferes with delivery of the service.

The integrated client application (embedded or non-embedded) utilizes a two layered approach to provide extensive protection capabilities against threats that use either Layer 3 (Network Layer) or Layer 5 (Session Layer) of the ISO Networking Model. The client application 1803 uses this multi-layered approach to protect against attacks that utilize an application level attack or one that uses a direct IP-port, or address level attack against a user's computer.

The BSECURE brand client application 1803 utilizes a unique "V-routing" data analysis technique to ensure there are no possible delays to the original requesting data in its transmission to its target. Each Internet request is allowed to proceed to its original destination while a copy of the packet information is decoded and processed accordingly by the client-to-delivery system interfaces. The requested data or information is also allowed delivery to the requesting system, but is held off from action at the application layer by the BSECURE brand client application 1803 until it can be determined what type of data was requested and delivered. If the BSECURE brand client application 1803 evaluates the requested data against the users policy definitions and determines it is not suitable to use, it will discard the data, place it in a holding queue, or replace the data depending on the service approach.

The client application 1803 includes: a version control module 1851 which interacts with a utility server 1807, a subscription module which interacts with authentication server 1809, activity reporting module 1857 which interacts with reporting server 1817, a content rating module 1855 which interacts with the master content database 1819. The client application 1803 communicates with the backend systems 1805 through multi-layer network interface module 1871. This permits communication through the V-routing communications technology or through more conventional techniques such as TCP/UDP port control. The client application 1803 further includes a user interface module 1863, a content caching module 1861, load balancing module 1865, an error handling module 1859, and an anti-virus module 1867. The user utilizes conventional third-party software to browse the internet (using browser module 1820, such as Netscape and AOL), to send and receive emails (using email applications 1822, such as Outlook), to send and receive instant messages (using instant messaging module, such as MSN, ICQ), and other applications (applications module 1826). The system also monitors for the requests for port access which are typical of Trojan and other hacking attempts (depicted as module 1828). Communications to and from these modules are individually generate "requests" which are either approved or denied by the client application 1803 after interaction with the backend systems 1805.

Figure 19:
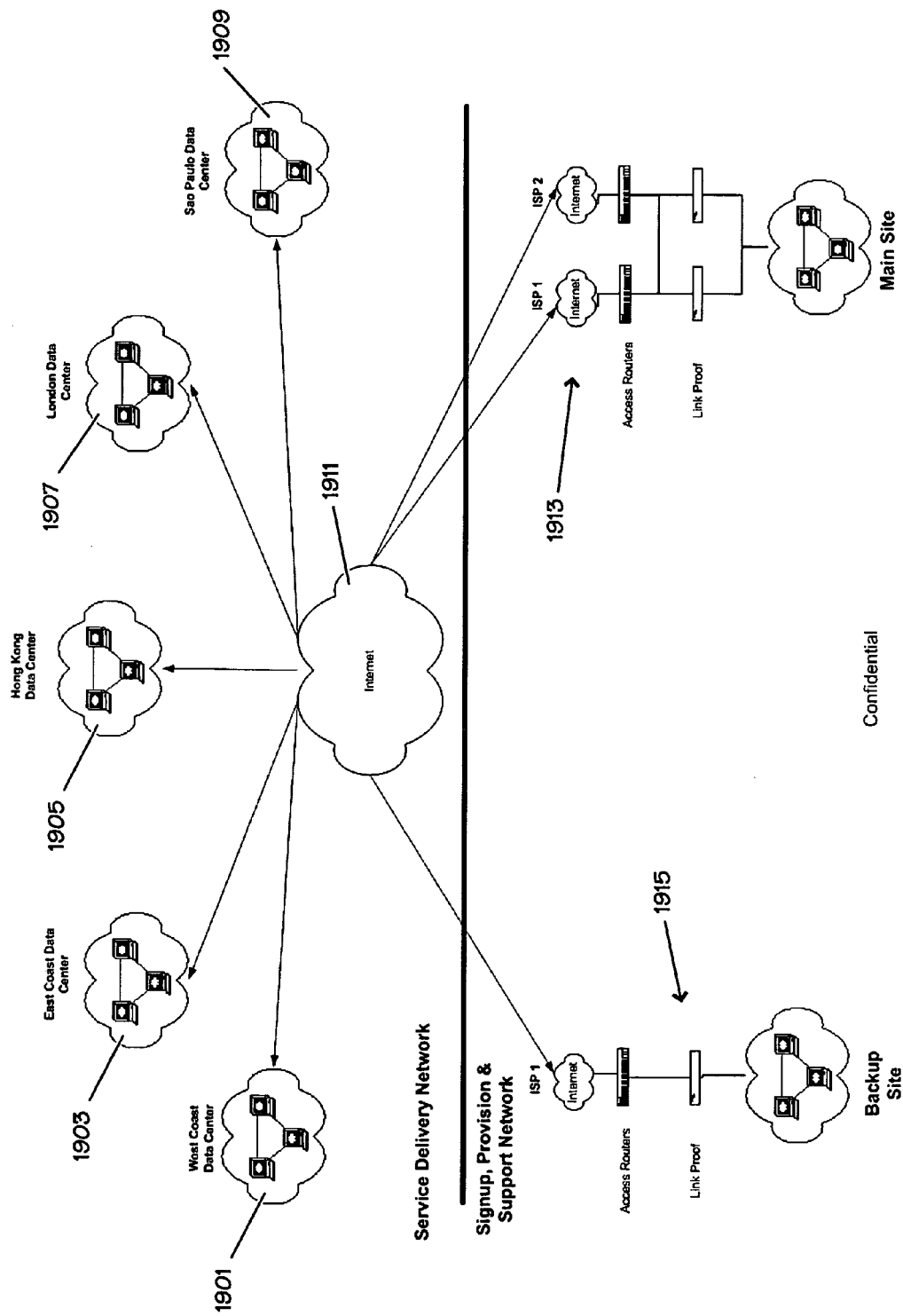
FIG. 19 depicts an overview of the server architecture.

FIG. 19 depicts the preferred data processing architecture of the present invention. A plurality of data centers 1901, 1903, 1905, 1907, 1909 are located around the planet, each serving a different geographic region; each is connected through the internet 1911 to a sign up, provision, and support network which includes a main site 1913 and a backup site 1915.

Figure 20:
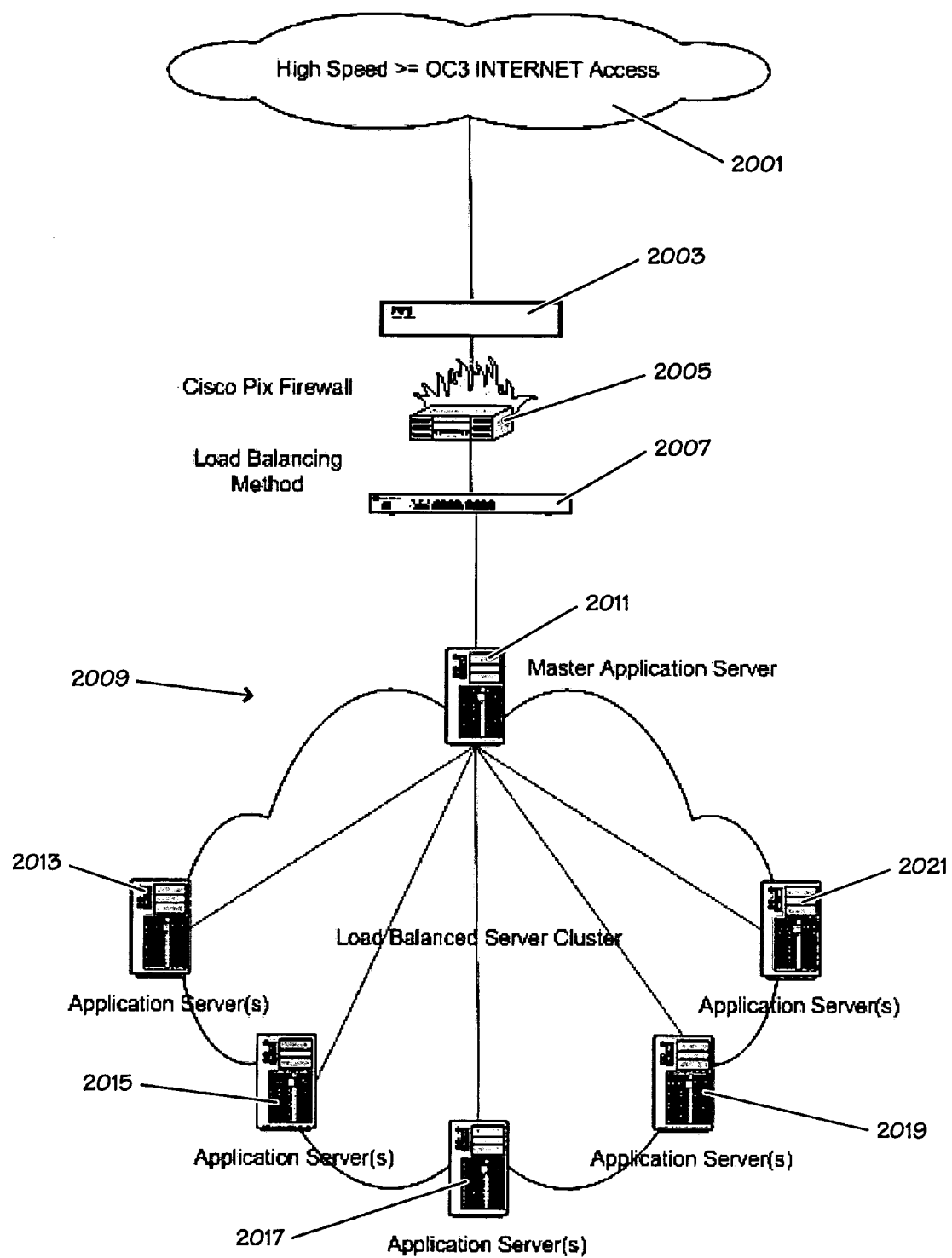
FIG. 20 depicts an overview of data service center architecture.

FIG. 20 depicts the preferred load balancing of the present invention. The server is accessed through high speed internet access 2001, and requests are received at port 2003. A Cisco brand firewall 2005 secures the servers. Load balancing software module 2007 is utilized to allocate requests for service throughout a load balanced server cluster 2009. A master application server 2011 receives the requests for service and determines which of the application servers 2013, 2015, 2017, 2019, and 2021 is best able to respond quickly, and the request is assigned to that particular server.

Figure 21:
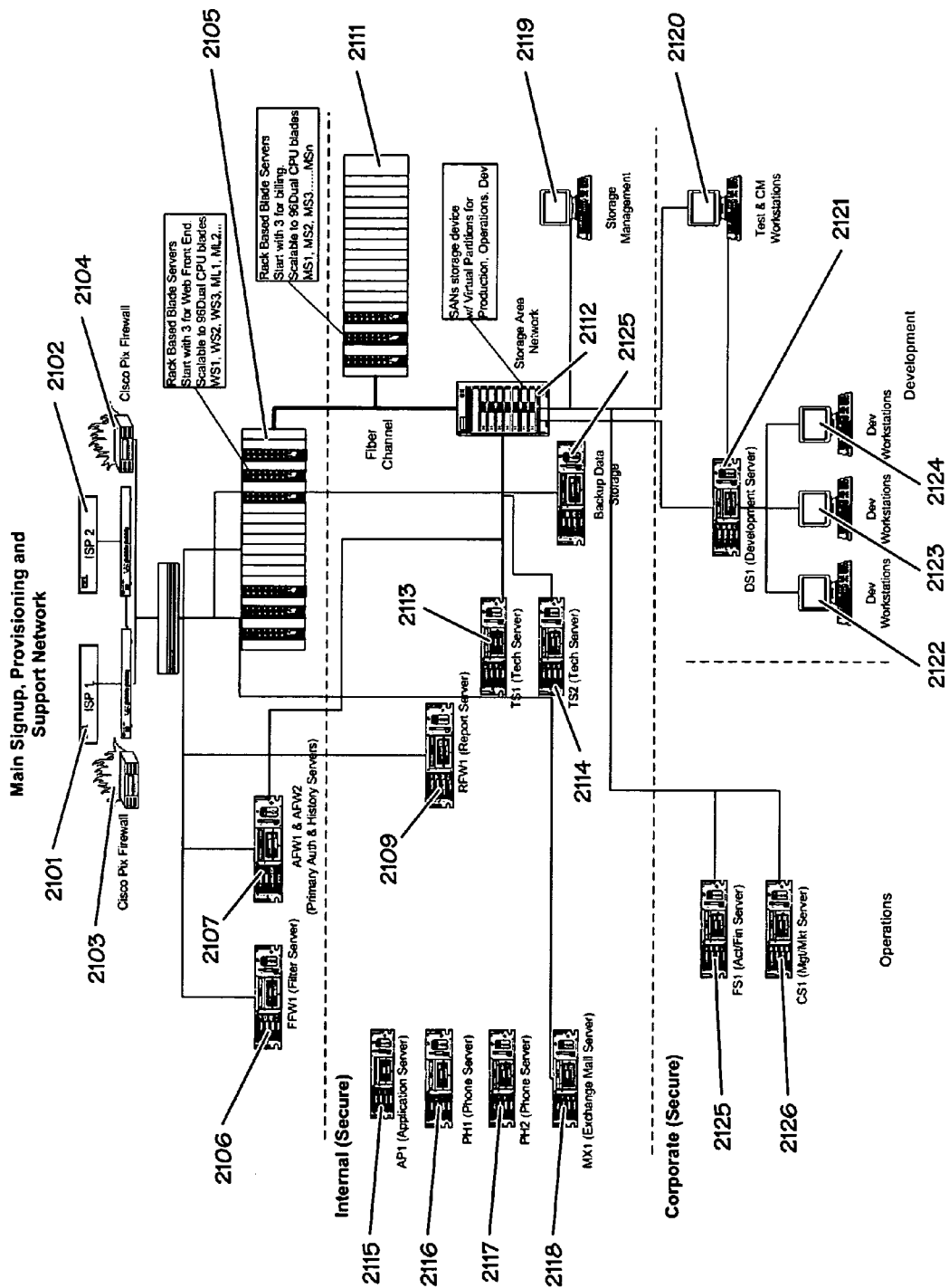
FIG. 21 depicts the signup, provisioning, and support network.

FIG. 21 depicts the main signup, provisioning, and support network. ISPs 2101, 2102 provide access to the network. Firewalls 2103, 2104 protect the network. A variety of servers are provided which are dedicated to particular functions, including: filter server 2106, rack based blade servers 2105 which operate as filter channels, primary authorization and history server 2107, report server 2109, application server 2115, phone servers 2116, 2117, exchange server 2118, tech servers 2113, 2114. A storage area network 2112 is provided and it has a backup 2125. A corporate level is provided with a development server 2121 and associated workstations 2110, 2122, 2123, 2124. A marketing server 2126 and an accounting server are also provided.

The Bsafe Online network infrastructure was designed to have maximum flexibility, have high availability of services and be easily expandable to meet market demands. Its network is divided into two hemispheres of services.

1. Signup/Support Network

Users who come to any of the Bsafe websites (eg. www.b-safehome.com), branded websites (eg. www.8e6home.com, www.omada.us) or any of our transparent backend ISP interfaces (eg http://eircom.bsafeonline.com/signup/signupasp) they are accessing a redundant system 2. Service Delivery Network Once users receive the download and services are provisioned to their client (embedded and non-embedded) the services are delivered from any one of our Service Deliver data centers on the Internet. These data centers are comprised of many servers making up a server farm and are represented by a single logical entry point IP address. The data centers are located at central Network Access Points (NAP)s to provide the highest rate of service delivery available on the Internet.

Figure 22:
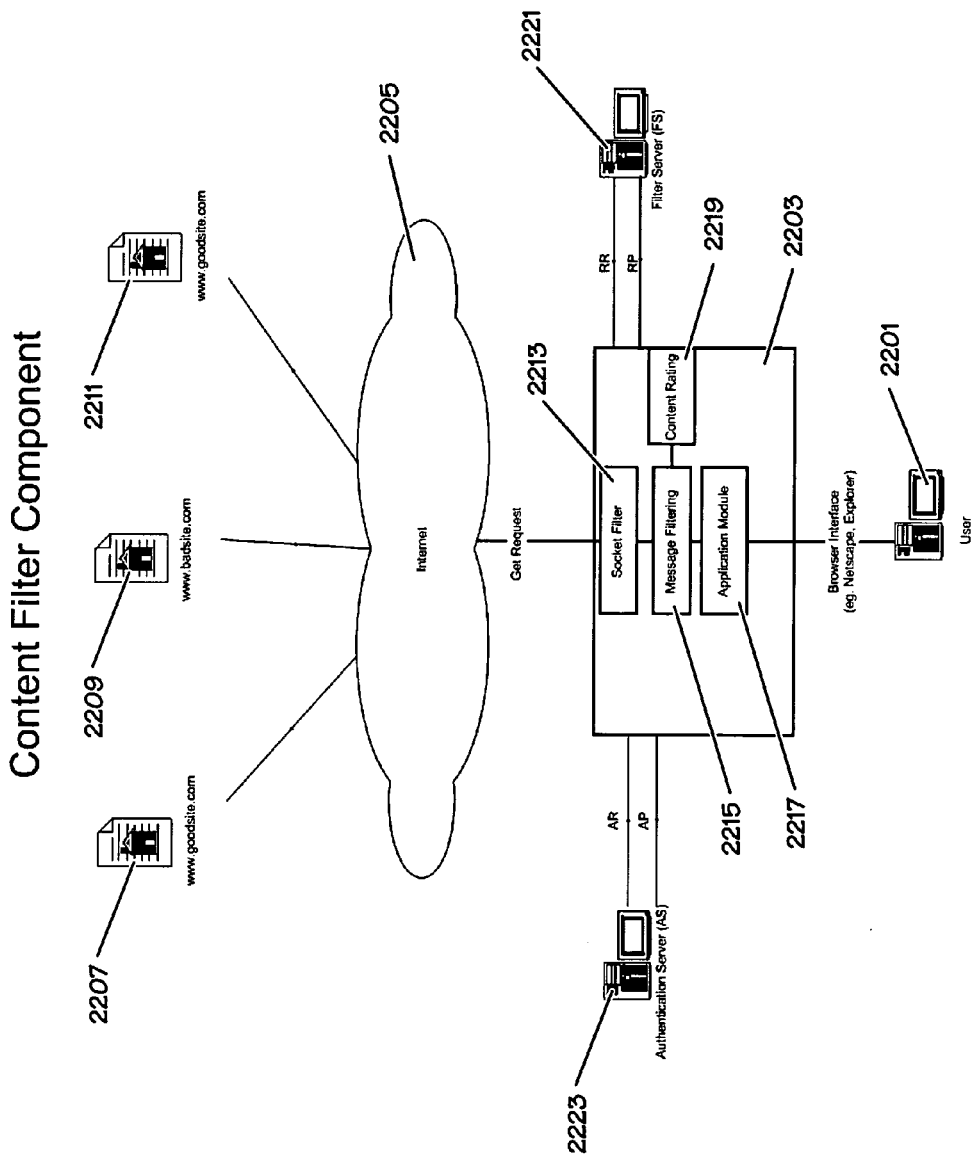
FIG. 22 depicts the content filter component.

FIG. 22 depicts the content filter component of this embodiment of the present invention. A user 2201 connects through the client application 2203 to the internet 2205. He or she may access internet sites, such as good sites 2207, 2211 and bad sites such as bad site 2209. The client application includes a socket filter 2213, message filter 2215, application module 2217, and content rating module 2219. When the user accesses a web site, the client application contacts the authentication server 2223 and obtains the associated account information and current bad word list. The client application will permit the web site to be accessed, but it will send a request for service to the filter server 2221 to determine if the requested web site has already be accessed and rated by any "member"; if so a rating is returned; if not, the client application is instructed to utilize its on-board content rating module 2219 to rate the content. The message filtering module is utilized to permit or deny access to the requested web site based upon either the outcome of the local content rating or the rating information supplied by the filter server 2221.

Figure 23:
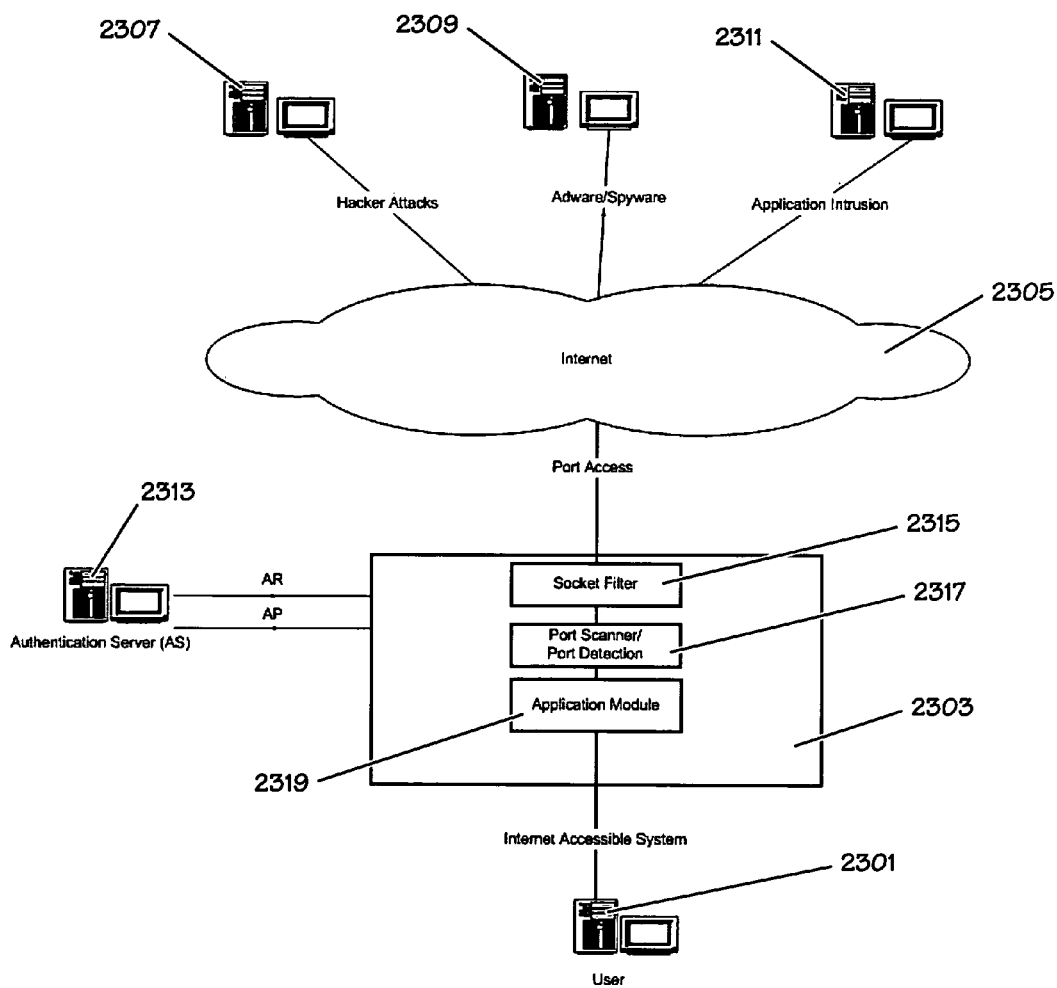
FIG. 23 depicts the personal firewall component.

FIG. 23 depicts the operation of the personal firewall. The user 2301 accesses the internet 2305 through client application 2303. The use's personal computer (or other device) is subject to various attacks such as hacker attack 2307, adware/spy-ware attacks 2309, and application intrusion 2311. The client application 2303 utilizes application module 2319 to monitor the socket filter 2315 and the port scanner/port detection module 2317.

Figure 24:
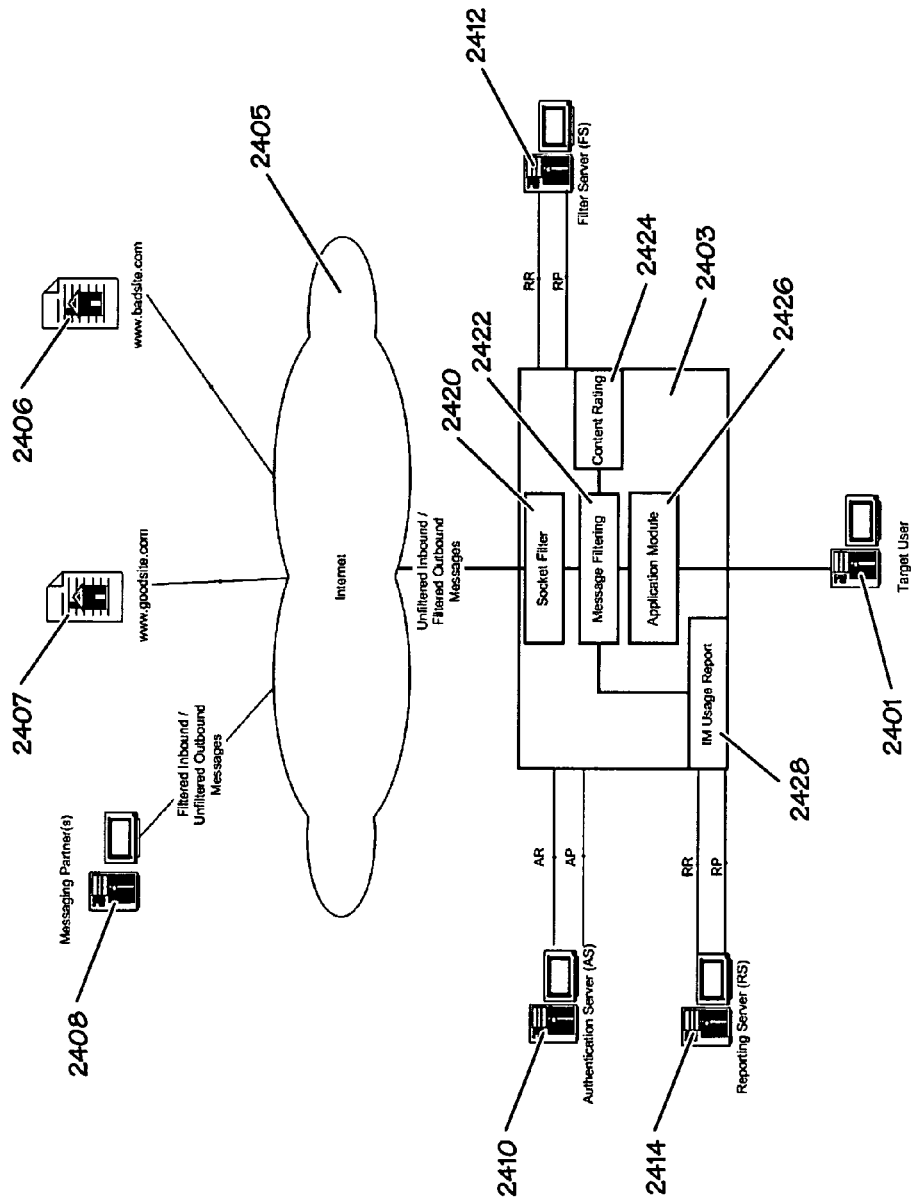
FIG. 24 depicts the activity reporting component.

FIG. 24 depicts the activity reporting component. User 2401 accesses the internet 2405 through client application 2403. The user is authenticated by authentication server 2401. He or she may then access digital content, such as instant messages 2408, good internet sites 2407 and bad internet sites 2406. The client application interacts with the filter server 2412 as described above. Incoming digital content is passed through socket filter 2420, and message filtering 2422. If the content is not already rated, the content rating module 2403 performs the rating operations. In the example of FIG. 24, the client application 2403 utilizes IM Usage Report module 2428 in order to send data to the report usage server 2414.

Figure 25:
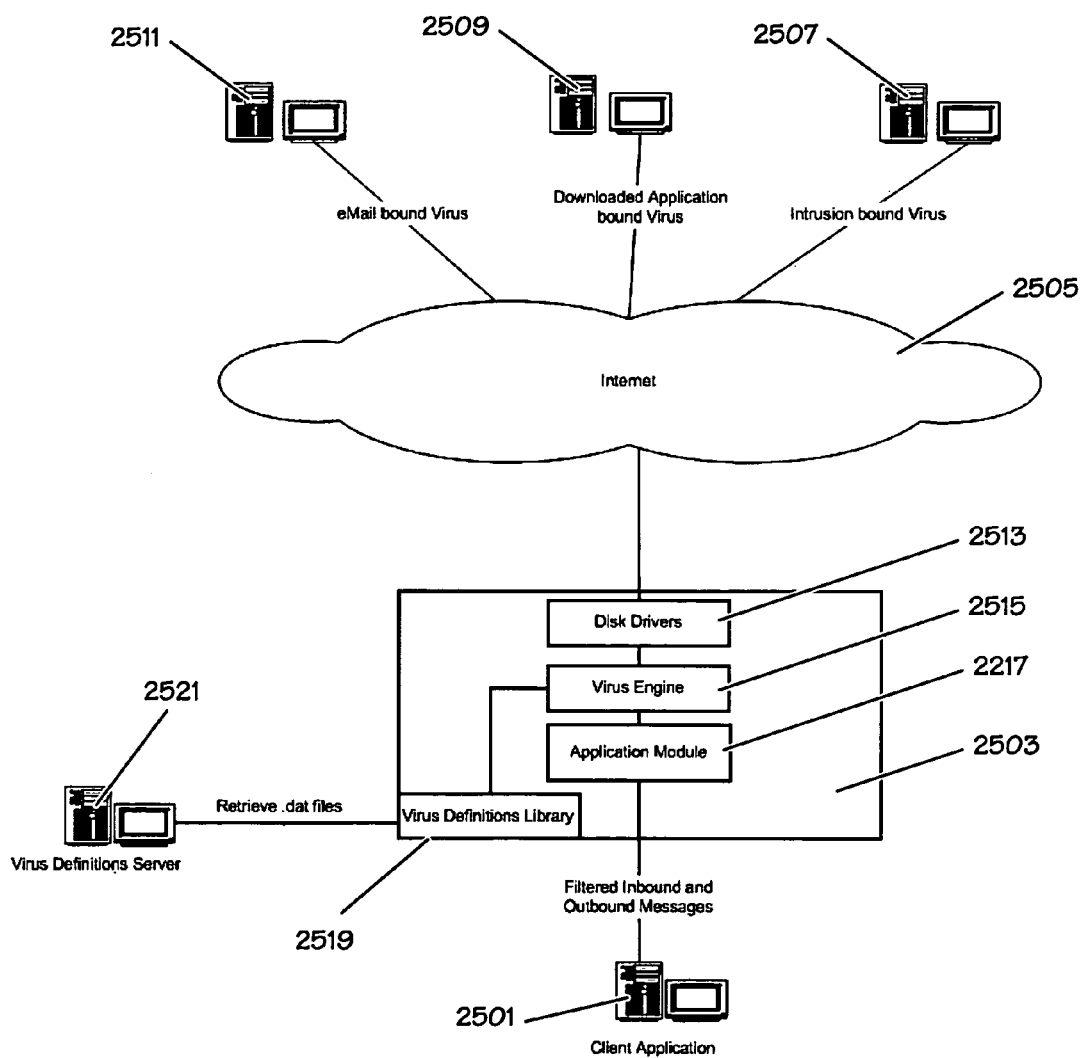
FIG. 25 depicts anti-virus protection component.

FIG. 25 depicts the anti-virus protection component of the present invention. User 2501 accesses the internet 2505 through client application 2503. He or she may interact with or receive digital content which has viruses, such as email bound virus 2511, application bound virus 2509, and intrusion bound virus 2507. The client application includes disk drivers 2513, virus engine 2515, application module 2517, and virus definitions library 2519. The client application 2503 interacts with virus definitions server 2521 in order to receive new or modified definitions for the virus definitions library 2519.

Figure 26:
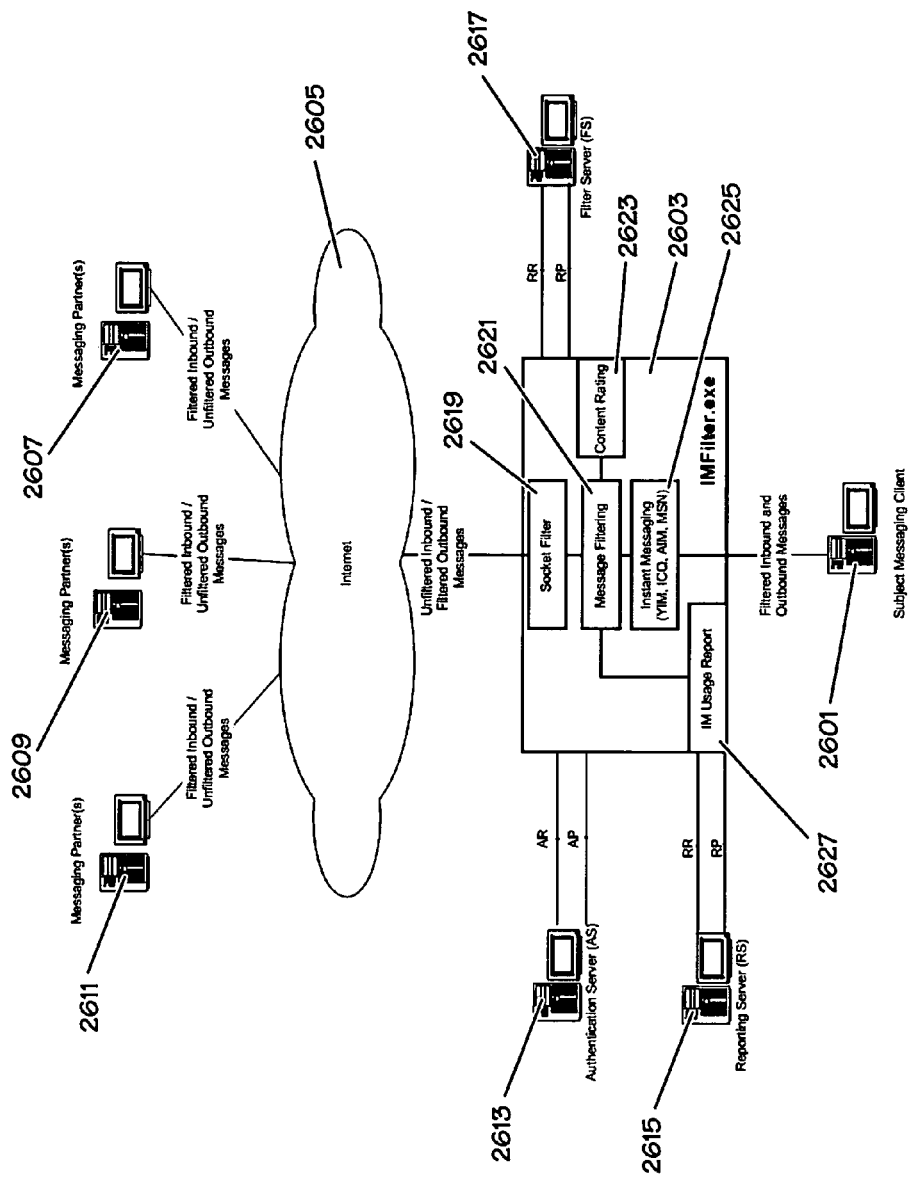
FIG. 26 depicts instant message filtering component.

FIG. 26 depicts the instant messaging filter component of the present invention. User 2601 accesses the internet 2605 through client application 2603. Client application 2603 interacts with authentication server 2613 to authenticate the user. It interacts with filter server 2617 to filter content utilizing the know rating or utilizing content rating module 2603 to rate new content. Messaging partners send and receive inbound/outbound unfiltered messages. Message filtering module 2621 is utilized to rate the text of the instant messages. Conventional instant messaging services 2625 are utilized for communications. Message filtering module 2621 generates an IM Usage Report which are communicated to reporting server 2615.

Figure 27:
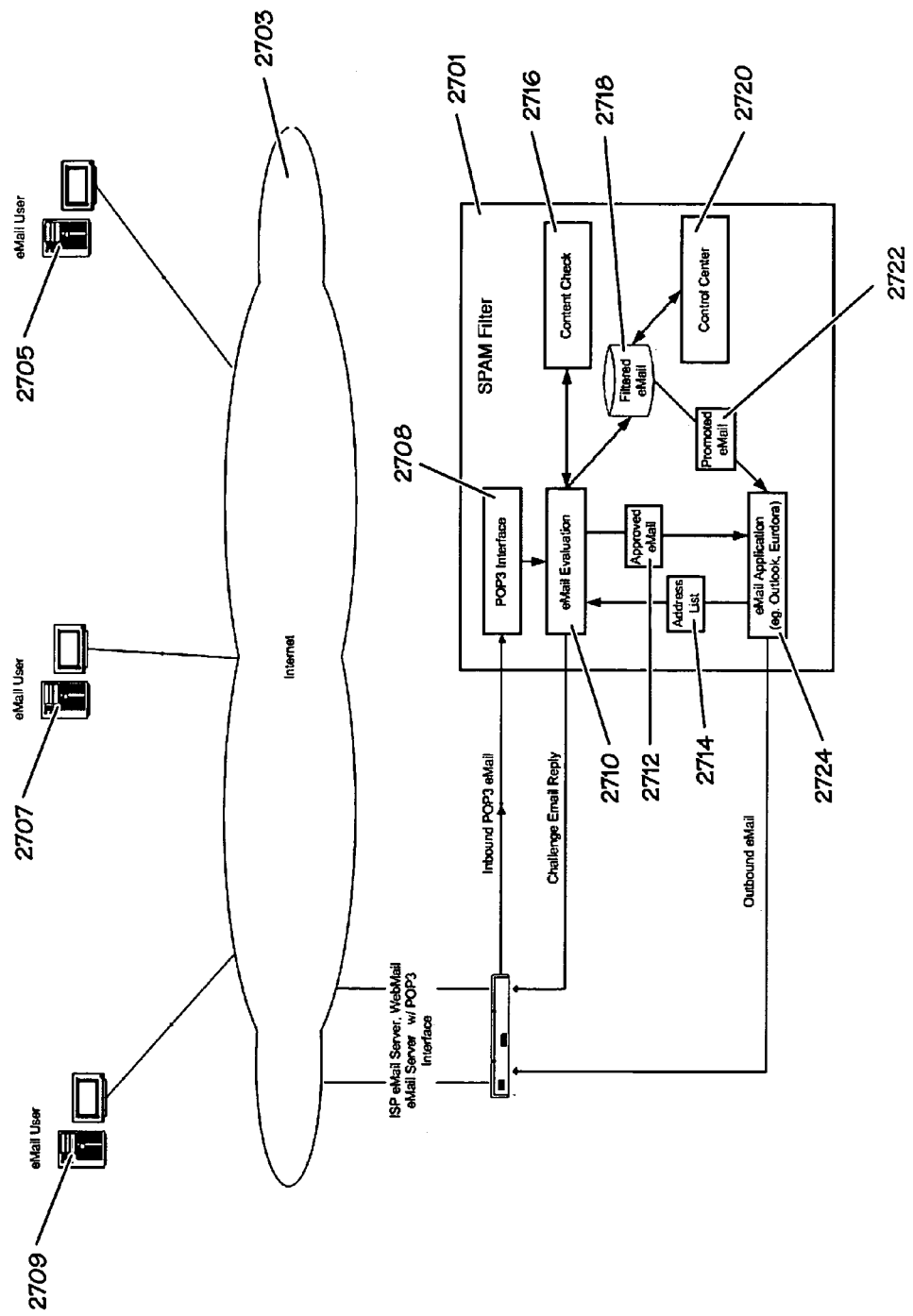
FIG. 27 depicts the Spam filter component.

FIG. 27 depicts the spam filter of the present invention. Spam filter 2701 is connected to the internet 2703 and screens and/or blocks unwanted "spam" communications. Email users 2705, 2707, 2709 send emails to the user. The spam filter 2701 receives inbound POP3 emails at POP3 Interface 2708. The incoming email is passed to email evaluation module 2710 for analysis. Approved emails are sent to email application 2724. Address list 2715 is passed to the email evaluation module 2710 from time-to time to update the list of approved recipients. Emails which are not from approved senders are routed to content checker 2716. Filtered email 2718 is passed to the control center 2720, and acceptable email 2722 is sent to the email application 2724.

FIGS. 28 and 29 depict two types of activity reports. FIG. 28 depicts a multi-user report, while FIG. 29 depicts a single user report.

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. It is therefore contemplated that the appended claims will cover any such modifications or embodiments that fall within the scope of the invention.

What is claimed is:

1. A method comprising:
for each electronic device of a plurality of electronic devices, in real time:
receiving, in a backend system, information related to digital data captured by the electronic device at a transport layer before the digital data is provided to an application layer for presentation to a user of the electronic device, the backend system comprising at least one server;
on the at least one server, determining a digital-data rating via the information related to the captured digital data, the determining comprising:

checking a ratings database for a pre-existing rating for the captured digital data using a network address included in the information related to the captured digital data;
responsive to the network address being found in the ratings database, using the pre-existing rating as the digital-data rating;
responsive to the captured digital data not being found in the ratings database:
crawling the captured digital data via the network address;
accessing the captured digital data over a network;
performing a word-by-word analysis of the captured digital data to determine the digital-data rating; and
updating the ratings database with the network address and the digital-data rating responsive to the performance of the word-by-word analysis;
designating the captured digital data as illicit digital data or non-illicit digital data, the designating comprising designating the captured digital data as illicit digital data if the digital-data rating exceeds a predetermined threshold; and
transmitting a result of the designating from the at least one server to the electronic device to block the illicit digital data from delivery to the application layer.

2. The method of claim 1, comprising, for each of the plurality of electronic devices, in real time, allowing delivery of the non-illicit digital data to the application layer for presentation to the user of the electronic device.

3. The method of claim 1, comprising, for each of the plurality of electronic devices, in real time, capturing all requests for digital data over the network by the electronic device.

4. The method of claim 3, comprising: for each of the plurality of electronic devices, concurrently routing:
information relating to at least some of the captured requests for digital data to the at least one server providing the content-rating service; and
the at least some captured requests to intended destinations on the network.

5. The method of claim 4, wherein at least some of the captured digital data is digital data received at the electronic device as a result of the step of routing the information relating to at least some of the captured requests for digital data to the intended destinations.

6. The method of claim 4, wherein at least some of the captured digital data is digital data received at the electronic device independent of the routing step.

7. The method of claim 4, comprising, on the at least one server:
crawling requested digital data on the network using the at least some of the captured requests; and
rating the requested digital data for illicitness using a word-by-word analysis of the requested digital data.

8. The method of claim 7, further comprising, responsive to the rating step, storing a rating and identification information for the rated digital data together in a content database in communication with the at least one server.

9. The method of claim 7, further comprising transmitting configuration settings to the electronic device corresponding to the valid user account.

10. The method of claim 3, comprising, for at least one of the plurality of electronic devices:
- transmitting an indication from the backend system that at least one of the captured requests for digital data represents an unauthorized intrusion on the electronic device; and
- denying the at least one of the captured requests for digital data.

11. The method of claim 1, comprising, for each of the plurality of electronic devices, sending an authentication signal to the backend system, the authentication signal providing validation information indicating whether the electronic device corresponds to a valid user account.

12. The method of claim 1, further comprising, for each of the plurality of electronic devices, filtering communication between the electronic device and the network for personal information.

13. The method of claim 1, further comprising, for each of the plurality of electronic devices, filtering communication between the electronic device and the network for explicit requests for illicit content.

14. The method of claim 1, wherein the electronic device comprises at least one of:
- a personal computer;
- a set-top box;
- a router; and
- a gateway.

15. The method of claim 1, wherein at least some of the captured digital data comprises an instant message en route to an instant messaging application on the electronic device.

16. The method of claim 1, wherein at least some of the captured digital data comprises an email message en route to an email application on the electronic device.

17. The method of claim 1, further comprising, for at least one of the electronic devices, rating the captured digital data for illicitness utilizing a content-rating module on the electronic device.

18. The method of claim 1, comprising, for at least one of the plurality of electronic devices:
- transmitting information related to the captured digital data to a reporting server; and
- on the reporting server, logging network activities of the user of the electronic device via the information related to the captured digital data.

19. The method of claim 18, comprising: on the reporting server, for the at least one of the plurality of electronic devices:
- generating a report summarizing illicitness of network activities of the user of the electronic device for a predetermined time period; and
- transmitting the report over the network to a third party.

20. The method of claim 18, comprising:
- wherein the at least one of the plurality of electronic devices comprises more than one electronic device;
- generating a multi-user report summarizing illicitness of network activities of each user of the more than one electronic device for a predetermined time period; and
- transmitting the multi-user report over the network to a third party.

21. The method of claim 1, comprising, for at least one of the plurality of electronic devices:
- transmitting an indication from the backend system to the at least one of the plurality of electronic devices on whether the captured digital data is malicious or non-malicious; and
- blocking the captured digital data deemed to be malicious.

22. A method comprising:
for each electronic device of a plurality of electronic devices, in real time:
- on the electronic device, at a transport layer, capturing all digital data received by the electronic device over a network before the digital data is provided to an application layer for presentation to a user of the electronic device;
- routing information related to the digital data to a backend system on the network, the backend system comprising at least one server, the at least one server providing a content-rating service for rating digital-data illicitness;
- delaying delivery of the digital data to the application layer on the electronic device at least until the digital data is designated non-illicit by the at least one server;
- on the at least one server, determining a digital-data rating via the information related to the digital data, the determining comprising:
  - checking a ratings database for a pre-existing rating for the digital data using a network address included in the information related to the digital data;
  - responsive to the network address being found in the ratings database, using the pre-existing rating as the digital-data rating;
  - responsive to the digital data not being found in the ratings database:
    - crawling the digital data via the network address;
    - accessing the digital data over the network;
    - performing a word-by-word analysis of the digital data to determine the digital-data rating; and
    - updating the ratings database with the network address and the digital-data rating responsive to the performance of the word-by-word analysis;
- designating the digital data as illicit digital data or non-illicit digital data, the designating comprising designating the digital data as illicit digital data if the digital-data rating exceeds a predetermined threshold;
- on the electronic device, receiving a result of the designating from the at least one server; and
- on the electronic device, blocking the illicit digital data from delivery to the application layer.

23. An article of manufacture, the article of manufacture comprising:
- at least one computer-readable medium;
- processor instructions contained on the at least one computer readable medium, the processor instructions configured to be readable from the at least one computer-readable medium by at least one processor and thereby cause the at least one processor to operate as to, for each of a plurality of electronic devices, in real time:
  - receive, in a backend system, information related to digital data captured by the electronic device at a transport layer before the digital data is provided to an application layer for presentation to a user of the electronic device, the backend system comprising at least one server;
  - on the at least one server, determine a digital-data rating via the information related to the digital data, the determining comprising:
    - check a ratings database for a pre-existing rating for the digital data using a network address included in the information related to the digital data;
    - responsive to the network address being found in the ratings database, use the pre-existing rating as the digital-data rating;
    - responsive to the digital data not being found in the ratings database:

crawl the digital data via the network address;
access the digital data over a network;
perform a word-by-word analysis of the digital data to determine the digital-data rating; and
update the ratings database with the network address and the digital-data rating responsive to the performance of the word-by-word analysis;
designate the digital data as illicit digital data or non-illicit digital data, the designating comprising designating the digital data as illicit digital data if the digital-data rating exceeds a predetermined threshold; and
transmit the designation from the at least one server to the electronic device so that the electronic device may block the illicit digital data from delivery to the application layer.

* * * * *